United States Patent [19]

Schwartz et al.

[11] Patent Number: 4,600,989
[45] Date of Patent: Jul. 15, 1986

[54] UNIVERSAL COMPUTER, RECORDED VIDEO INTERFACE

[75] Inventors: Marc D. Schwartz, New Haven; Christopher B. Sura, Derby, both of Conn.

[73] Assignee: CAVRI Systems, Inc., New Haven, Conn.

[21] Appl. No.: 751,035

[22] Filed: Jul. 1, 1985

Related U.S. Application Data

[63] Continuation of Ser. No. 354,460, Mar. 3, 1982, abandoned.

[51] Int. Cl.$^4$ .............................................. G06F 1/00
[52] U.S. Cl. ................................. 364/200; 360/72.2
[58] Field of Search ... 364/200 MS File, 900 MS File; 360/72.2; 358/340

[56] References Cited

U.S. PATENT DOCUMENTS

| | | | |
|---|---|---|---|
| 4,375,091 | 2/1983 | Dakin et al. ............... | 360/72.2 X |
| 4,380,049 | 4/1983 | Eisenhard et al. ......... | 364/200 |
| 4,419,699 | 12/1983 | Christopher et al. ....... | 358/340 |
| 4,449,198 | 5/1984 | Kroon et al. .............. | 364/900 |
| 4,500,956 | 2/1985 | Leininger ................. | 364/200 |
| 4,531,184 | 7/1985 | Wigan et al. .............. | 364/200 |

*Primary Examiner*—Raulfe B. Zache
*Attorney, Agent, or Firm*—F. Eugene Davis, IV

[57] ABSTRACT

An interface computer having an RS232 port for connection to a host computer. The recorder is connected to the interface computer by a control cable providing more lines than required. The source provides a control signal on another line. This control signal is provided every frame or twice per frame, i.e., every field. Two tables identifying the control lines are stored. The user selects the type of equipment to be utilized and the table appropriate to most of such equipment is transferred to the random access memory of the interface computer. Frame identifying data is recorded periodically on one of the audio channels of the video equipment. When the host computer desires the video player to skip to a particular frame and number, the interface runs the video equipment to a stopping range of frames before the desired frame and then stops the video equipment. The video equipment will overshoot in rewind and fast forward and the overshoot varies depending on tape position. The stopping range is related to the maximum overshoot in fast forward and rewind, and to the slip from start to when video occurs. Thus when the video is restarted the first frame to appear will be approximately thirty frames before the desired frame so that the desired frame will come up within half a second.

29 Claims, 7 Drawing Figures

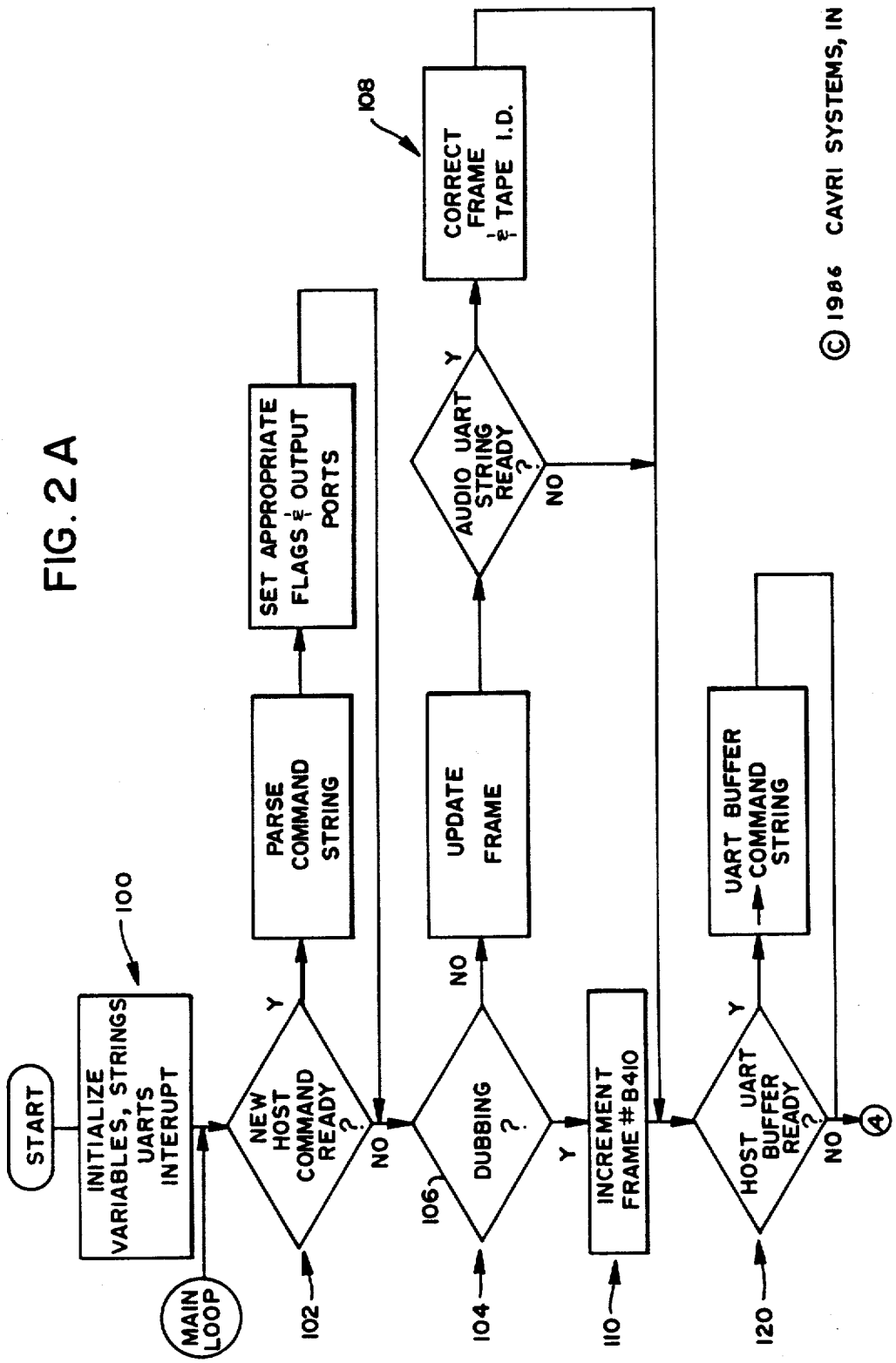

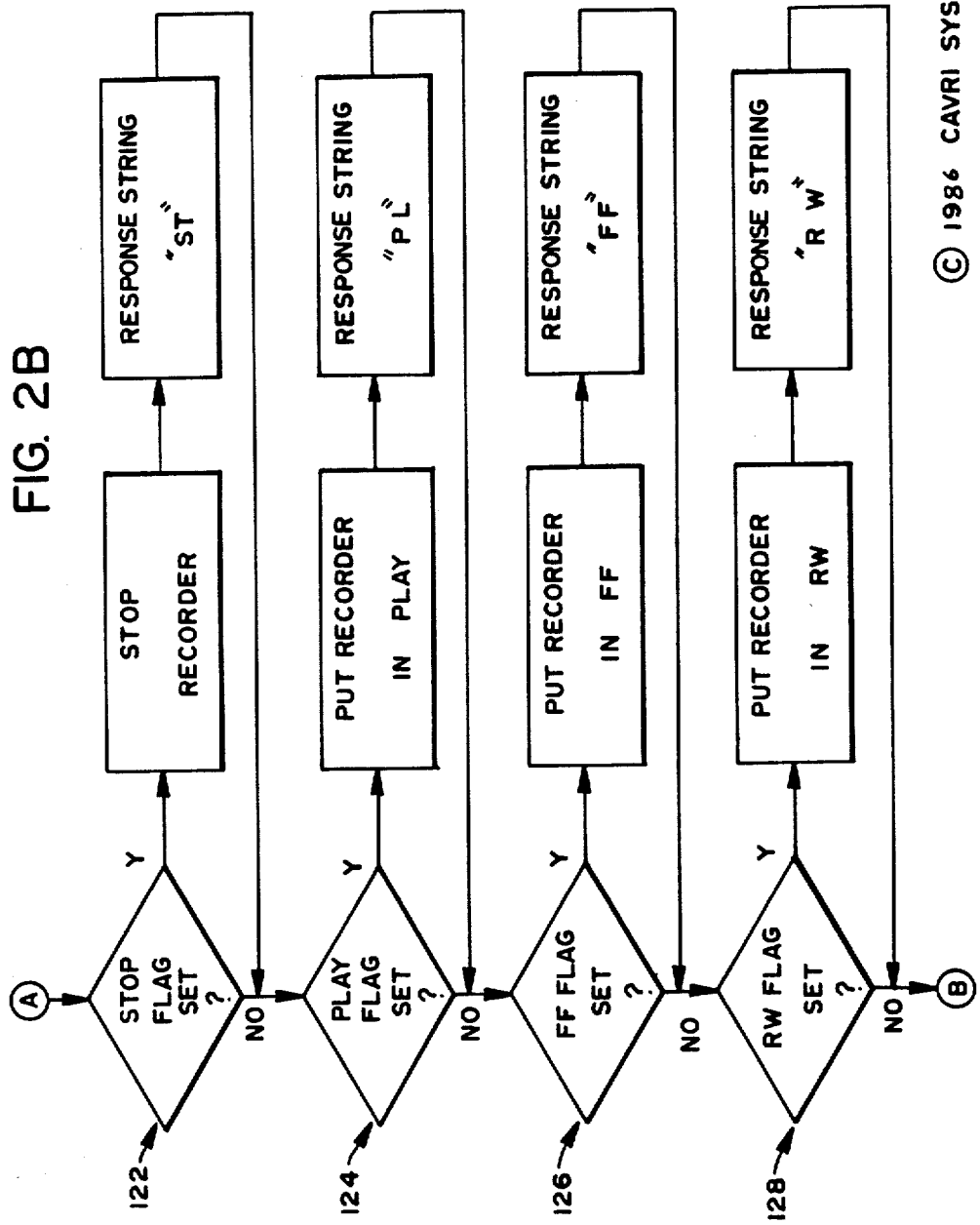

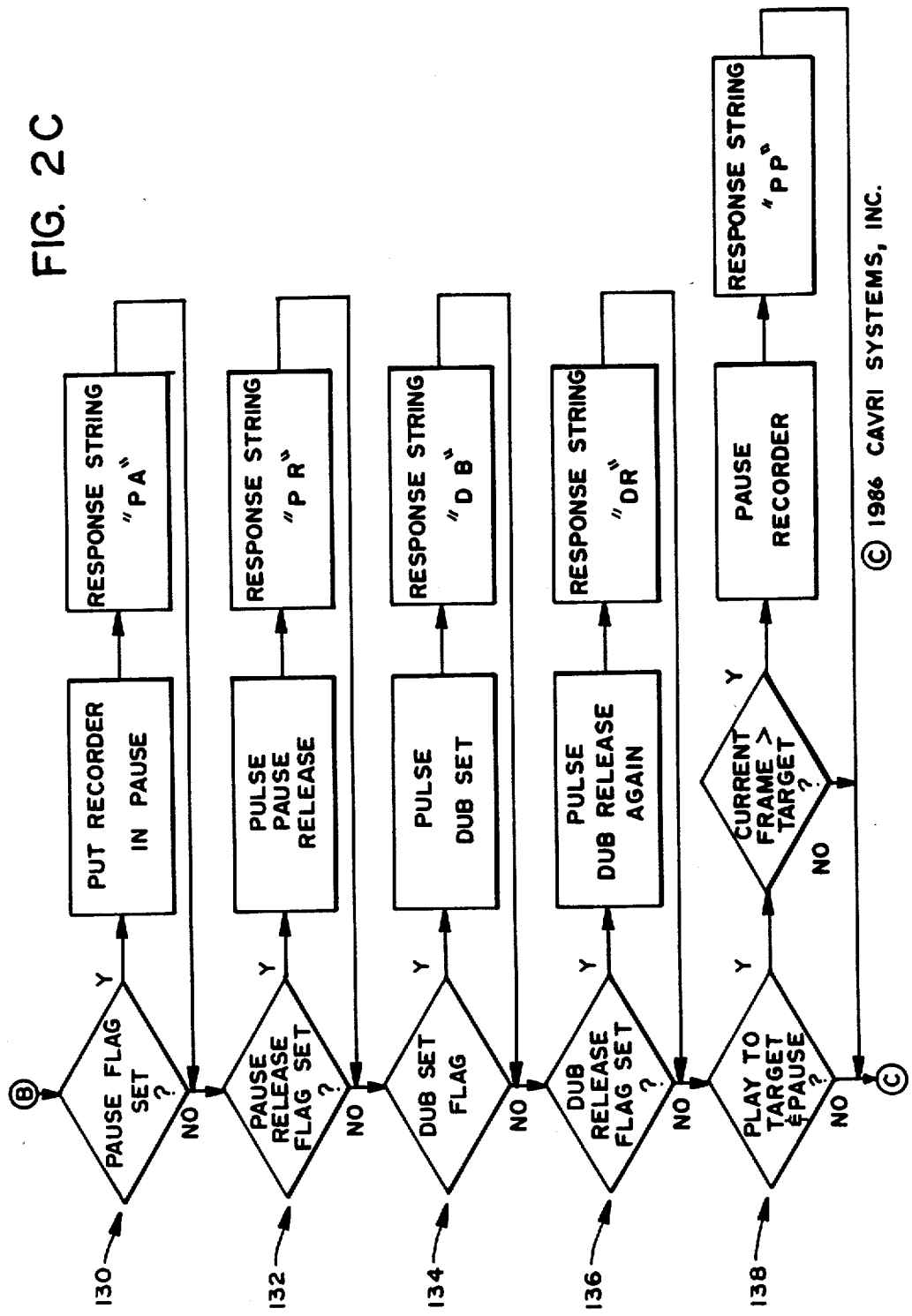

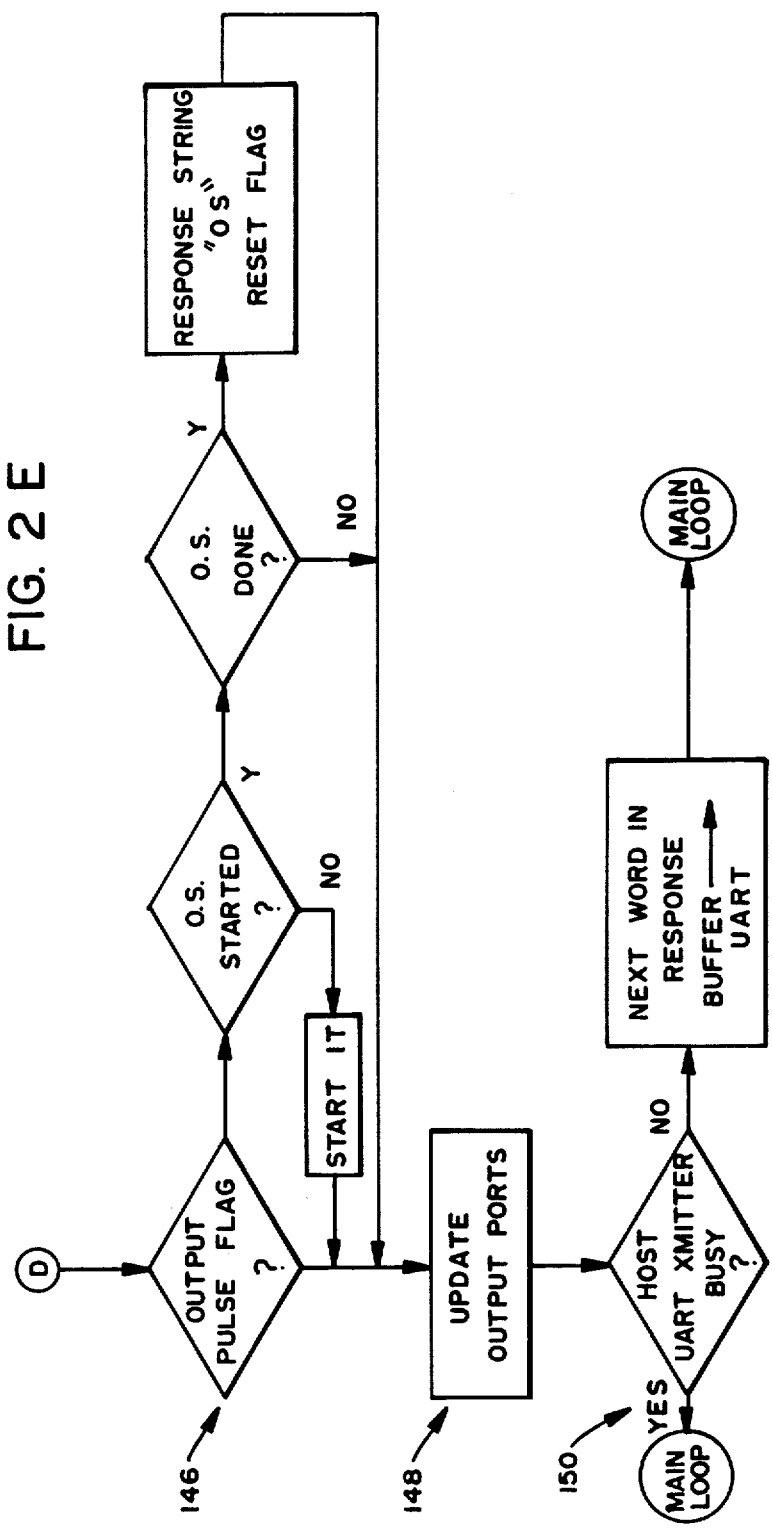

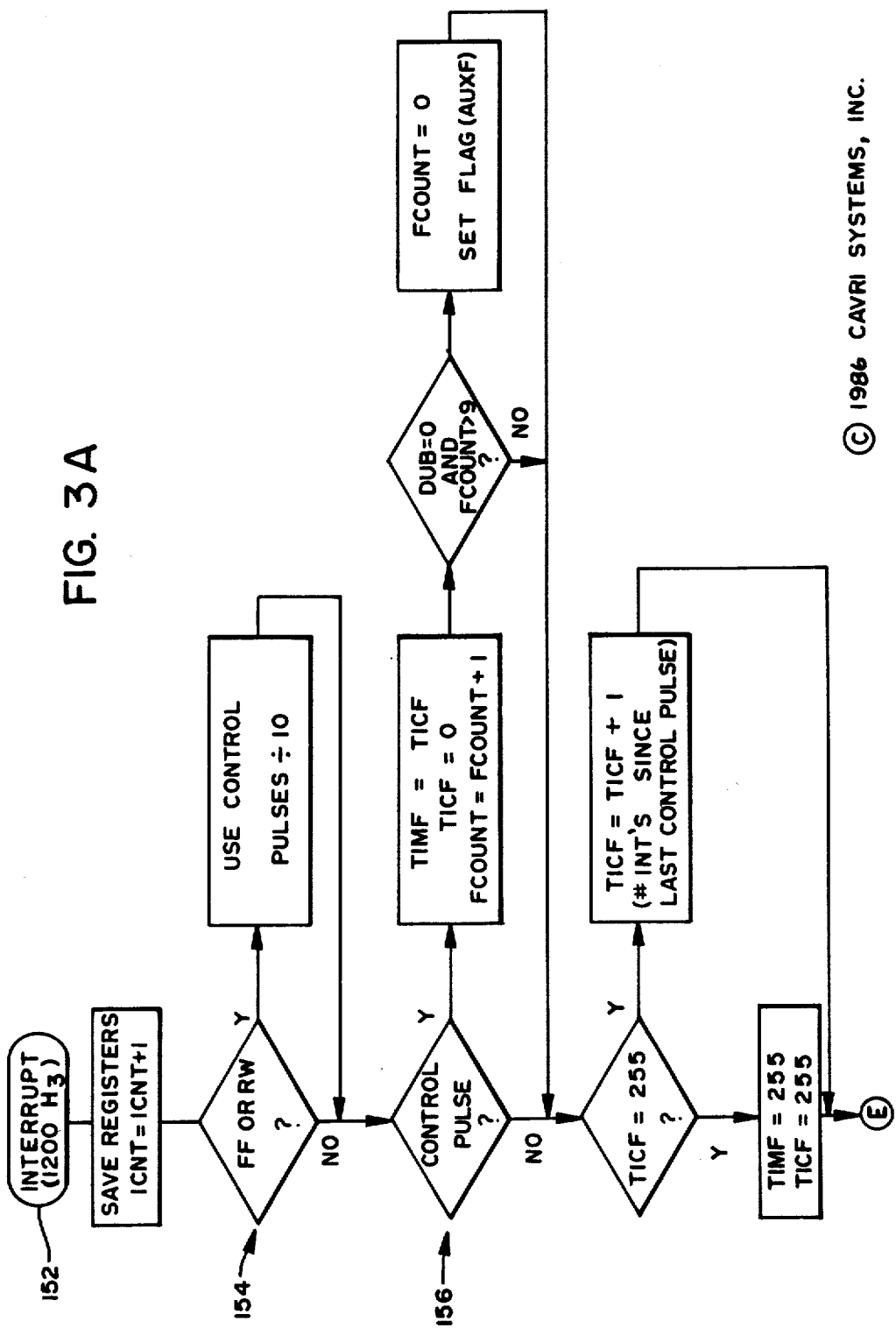

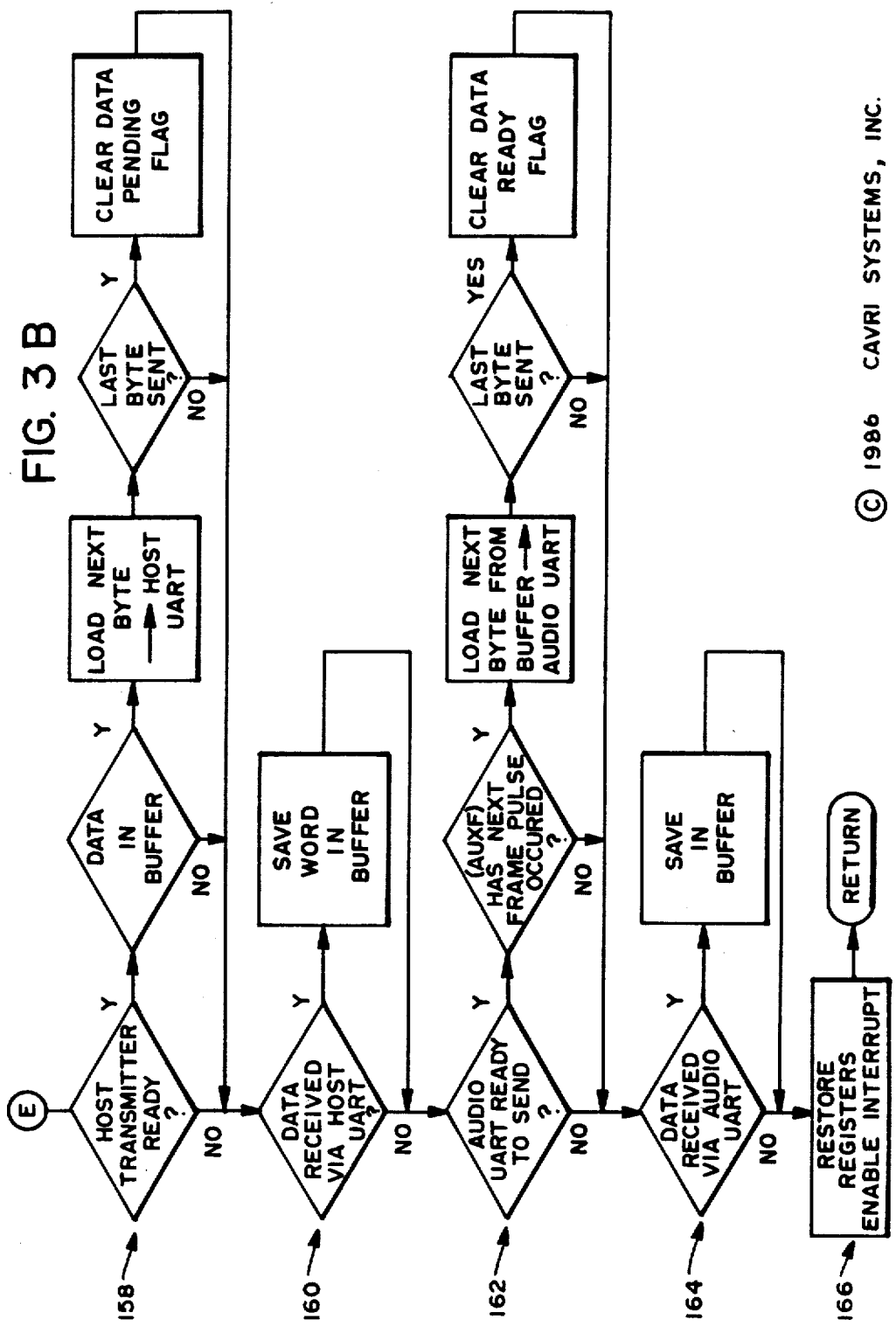

UNIVERSAL COMPUTER, RECORDED VIDEO INTERFACE

This application is a continuation of application Ser. No. 354,460, filed Mar. 3, 1982 now abandoned.

TECHNICAL FIELD

This invention relates to a Universal Computer, Recorded Video Interface. More particularly it relates such an interface which may be conveniently utilized with any existing or contemplated recorded video equipment or with such equipment designed in the future. The interface provides a multi-line control cable for connection to video equipment providing more than enough lines to control any present or contemplated video source.

The universal adaptability of the interface is provided by utilizing microprocessor control. Storeded tables are provided indicating the control signals both to and from the video equipment and the lines on which they occur over the control cable. These tables may be called up by the user. Additionally the user can write his own table to accommodate any special needs or new video equipment employing different control line principles.

The tables and the control program of the interface are stored in a read-only memory. The interface is provided with an expansion port so that entirely different control schemes for new video equipment may be provided for by merely changing the program stored in the computer, that is, by changing the read-only memory.

The Universal Computer, Recorded Video Interface of the invention may be utilized to connect a host computer to video equipment wherein the host computer contains a program for programmed learning utilizing segments of the recorded video in a random order chosen by the answers given by the student.

Additionally the Universal Computer, Recorded Video Interface of the invention may be utilized to write such programmed learning programs on a host computer.

Provision is made to record on an audio track of the video source, record and frame indicia prior to writing a programmed learning program on the host computer.

BACKGROUND ART

Control of a video tape recorder or video disc player by a host computer has been accomplished in the prior art by providing the host computer with a dedicated I/O port connected by a appropriate cable and connector to the video equipment. Not only has this required separate I/O boards for equipment providing control signals every frame and equipment providing two control signals per frame, but different manufacturer's equipment employ different connectors and even the same manufacturer's equipment, when employing the same connector, may employ different pins of the connector for the same control function in different models.

Furthermore, new equipment continues to be available at a rapid pace. This new equipment often requires different connections and different forms of control signals. Home video equipment, for example, utilizes matrix signaling, that is pairs of row and column lines are pulsed or grounded to indicate a particular signal. The manufacturers of the newer video disc equipment have already stated that there will be radical changes in their equipment in the immediate future. Thus, according to the prior art, the ability to interface a host computer to a wide variety of video equipment requires multiple I/O boards, multiple cables, multiple connectors, etc., and is very expensive.

DISCLOSURE OF THE INVENTION

The present invention provides a Universal Computer, Recorded Video Interface, generally indicated at 20 in FIG. 1. A host computer 22 is connected to the interface via a serial ASCII RS232 port 24. A monitor 26 is connected to the interface 20 as is video equipment 28. The interface 20 comprises a microprocessor 30, a programmable read-only memory (PROM) 32 containing the control program, and a random access memory (RAM) 34, and appropriate I/O ports.

In the particular form of the interface disclosed, two tables are recorded in the PROM 32 which identify the lines on a 48 line control cable 36 upon which the standard signals for controlling existing industrial video equipment 28 and for the video equipment 28 to respond, occur. These signals are STOP, STOP READ (the signal provided by the video equipment to indicate that it is in the stopped condition), PLAY, PLAY READ (the signal provided by the video equipment to indicate that it is in the PLAY condition), FAST FORWARD, FAST FORWARD READ (the signal provided by the video equipment to indicate that it is in the FAST FORWARD condition), REWIND, REWIND READ (the signal provided by the video equipment to indicate that it is in the REWIND condition), PAUSE, PAUSE READ (the signal provided by the video equipment to indicate that it is in the PAUSE condition), DUB, and DUB READ (the signal provided by the video equipment to indicate that it is in the DUB condition). Other tables including other signals could be recorded in PROM 32 for other equipment.

The two tables recorded in the PROM 32 correspond to two broad categories of industrial video equipment SONY and nearly all others. The user selects SONY or all others by operating a dip switch 38. Upon initialization of the microprocessor 30, this causes the appropriate table recorded in the PROM 32 to be transferred to the random access memory 34. The condition of the dip switch 38 also conditions the interface 20 to respond to control signals on control line 40 from the video equipment which occur once per field in SONY equipment and once per frame in most other equipment. The user can also set up his own control table using the keyboard 40 of the host computer.

Provision is made for recording record and frame number indicia on the video record. These indicia are recorded via tone signals supplied by tone generator 43 to one of the audio channels 44 of the video equipment and are read via tone receiver decoder 42.

A feature of the interface 20 is that skip commands that may require fast forwarding to a particular frame or rewinding to a particular frame take into account the overshoot of the presently available tape equipment and leave the equipment at a frame approximately 90 frames before the frame sought, so that when the equipment goes into the play mode the monitor will begin to display approximately 30 frames before the desired frame.

In order that the interface 20 may be utilized with a wide variety of equipment, an expansion port 46 is provided which may, for example, be connected to an interface 48, connecting cable 50 and new video equipment 52 (or a host computer requiring an interface other than interface 60). The new video equipment may, for example, be home video recorders employing matrix switching in which case the interface 48 is a matrix switcher, and the control program recorded in the PROM 32 is appropriately altered to operate the switcher 48 through the expansion port 46.

OBJECTS OF THE INVENTION

It is therefore an object of the invention to provide a Universal Computer, Recorded Video Interface.

Another object of the invention is to provide such an interface for use with video tape and video disc equipment.

A further object of the invention is to provide such an interface which may be connected to a standard output port of any host computer.

Still another object of the invention is to provide such an interface that can assign the same function to different lines on an individual control cable under user control.

Yet still another object of the invention is to provide such an interface internally storing tables for assigning functions to individual lines of a control cable under user control.

Still yet another object of the invention is to provide a program stored in programmable read-only memory, storing such tables and control programs of such an interface.

A further object of the invention is to provide such an interface which may be easily adaptable to other control schemes for new video equipment.

A further object of the invention is to provide such an interface which can record and frame identifying data on a video record.

A still further object of the invention is to provide such an interface which can play to, rewind to, or fast forward to a frame specified by the host computer.

Yet still another object of the invention is to provide such an interface that can be easily modified to provide additional functions.

Another object of the invention is to provide such an interface requiring only as many control cables as there are video equipment connectors in order to be adaptable to all video equipment.

A further object of the invention is to provide such an interface program and read-only memory that will improve the art of program teaching.

Other objects of the invention will in part be obvious and will in part appear hereinafter.

The invention accordingly comprises the features of construction, elements, functions, steps, signals, and arrangements of parts which will be exemplified in the system, apparatus, articles and programs hereinafter set forth. The scope of the invention is indicated in the claims.

BRIEF DESCRIPTION OF THE DRAWINGS

For a fuller understanding of the nature and objects of the invention reference should be had to the following detailed description taken in connection with the accompanying drawings in which:

FIGS. 2A, 2B, 2C, 2D and 2E, comprise a flow chart of the main loop of the program employed in the Universal Computer, Recorded Video Interface of FIG. 1; and, FIGS. 3A and 3B comprise a flow chart of the interrupt program utilized by the Universal Computer, Recorded Video Interface of FIG. 1.

The same reference charactes refer to the same elements throughout the several views of the drawings.

BEST MODE FOR CARRYING OUT THE INVENTION

Figure 1:
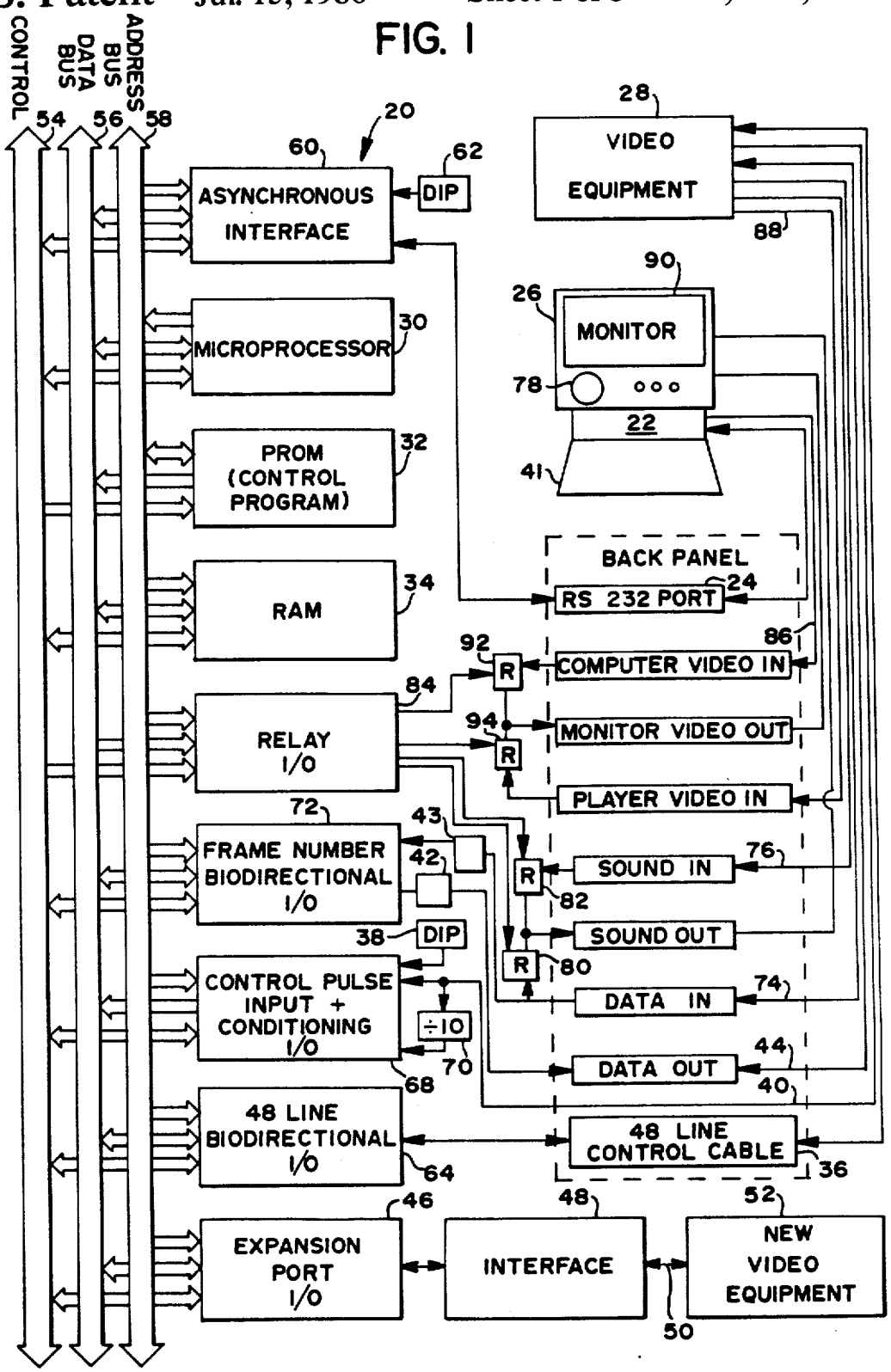
FIG. 1 is an overall system block diagram of the Universal Computer, Recorded Video Interface of the invention connected to a host computer and video equipment.

The microprocessor controlled interface 20 comprises the usual control bus 54, data bus 56, and address bus 58 to which the microprocessor 30, PROM 32, RAM 34, and expansion port 46 are connected. An asynchronous interface 60 is connected to the RS232 port 24 and it is appropriately set by dip switches 62 and/or jumpers to set the parity, character length, etcetera of the RS232 port 24 to communicate with the host computer 22. The control cable 36 is connected to a 48 line bi-directional I/O 64 for controlled communications to and from the video equipment 28.

The control signal on line 40 is directly supplied to I/O 68 and to a divide-by-ten counter 70, whose output is also supplied to I/O 68 for purposes which will become apparent below.

Frame number bi-directional I/O 72 receives signals from tone decoder 42 which is connected to line 74 from one of the audio tracks from the video equipment 28. It also supplies tone generator 43 which supplies tone signals on line 44 into that channel at the video equipment 28. The second sound channel from the video equipment 28 provides signals on line 76. The signals from either sound channel can be supplied to the speaker 78 of the monitor 26 by means of relays 80 and 82 under control of the relay I/O 84.

The host computer 22 supplies video on line 86. The video equipment supplies video on line 88. These may be switched to the video display screen 90 of the monitor which is located adjacent to the keyboard 40 by means of relays 92 and 94, also controlled by the relay I/O 84.

The microprocessor 30 may conveniently take the form of a Z80 microprocessor chip. The PROM 32 may be five or more 2716's; the RAM 34 a 4801. The asynchronous interface 60 may be an 8251A; the relay I/O 84 an 'LS273. The frame number and bi-directional I/O 72 may be an 8251A; the control pulse input and conditioning circuit 68 may comprise a 'LS541 which may also be associated with the dip switches 38 and 62; the 48 line bi-directional I/O 64 may comprise for the outputs two 'LS273's and for the inputs four 0098's. The microprocessor 30 of course includes appropriate clocking and buffering circuitry for operating the buses 54, 56, and 58. The expansion port 46, if provision is not made for new equipment 52, may take the form of an appropriate connector to the buses 54, 56, and 58. Otherwise, appropriate UART's, PIA's, buffering and latching circuitry, as needed, would be provided for the particular interface 48.

All of the lines of the 48 line control cable 36 are normally biased high to +5 volts. All signals from the interface 20 to the video equipment 28 take the form of grounding the appropriate control line for 200 milliseconds. All of the READ (status) signals sent back by the video equipment 28 take the form of grounding the appropriate control line 36 while the video equipment 28 is in that mode or status.

All communication between the host computer 22 and the interface 20 are in ASCII serial code over the RS232 port 24. Of course other ports could conveniently be provided as well as other codes, by appropriate modification of the asynchronous interface 60 or another form of computer to computer interface 48 could be connected to the expansion port 46. The record and frame number indicia in the apparatus disclosed are recorded by the video equipment 28 in the form of ASCII tone code. Because these numbers and this code take up more than one frame on presently available video recorders, this invention is recorded every ten frames and use of made of the control pulse on control line 40 to interpolate to frame numbers not divisible by ten. However, other codes such as binary might be employed in which case the frame numbers could be recorded every frame. The control pulses on line 40 are also used during rewind and fast forward.

Commands and Responses

The interface 20 of the invention is responsive to the following commands from the host computer 22 and provides the following responses to it.

The interface does not lock out any defined commands. Any new command that conflicts with the current operating mode of the video equipment 28 supercedes the current mode. On the other hand, commands that do not conflict (e.g. commands that request information) do not change the current operating mode.

A minimum time interval of 100 milliseconds is required between the end of one command and the start of another to allow the interface to complete a program cycle.

Formats

All communications between the host computer 22 and the interface 20 are in ASCII characters over the RS232 port 24.

There are three general formats:
1. Commands without a data field comprise three characters, a first function code character, a second function code character, and a carriage return.
2. Commands with a data field comprise a first function code character, a second function code character, a space, data digits, and a carriage return.
3. Responses have the same format as commands, with and without data fields, and are followed by a line feed character after the carriage return character.

Functions

The following immediate video source control commands cause the interface 20 to appropriately signal the video source 28, which may be a VCR, to place it into the mode (condition) noted.

| Command | Video Mode |
|---------|------------|
| DB | DuB |
| DR | DuB Release |
| FF | Fast Forward |
| PA | PAuse |
| PL | PLay |
| PR | Pause Release |
| RW | ReWind |
| ST | STop. |

Upon receiving each of the above commands from the host computer 22, the interface 20 grounds the corresponding one of the control lines 36 for 200 milliseconds. Also in response to DB, the PLAY control line is pulsed if the recorder is not in PLAY. Pause Release and Dub Release are not separate control lines. A second ground pulse on the Pause line following the Pause pulse serves this purpose. Dub Release is accomplished by pulsing the STOP line.

Upon receiving each of these command signals from the interface 20, the video equipment 28 goes into the video mode noted in the above table. Present day VCR's provide a ground signal (command Read signal) on appropriate individual lines indicating when it is in the DUB, FAST FORWARD, PAUSE, PLAY, REWIND and STOP modes.

The interface sets appropriate flags in the computer program of the microprocessor 30 in response to a command signal or command read signal where appropriate.

The interface 20 provides the host computer 22 with the following responses to the above control commands.

| Response | When Issued |
|----------|-------------|
| DB | Response to DB command, issued after the 200 millisec DB pulse. |
| DR | Response to DR command, issued when speed is less than 47 frames/sec. |
| FF | Response to FF command, issued when speed is greater than 60 frames/sec. |
| PA | Response to PA command, issued when speed is less than 4.7 frames/sec. |
| PL | Response to PL command, issued when speed is greater than 27 frames/sec. |
| PR | Response to PR command, issued when speed is greater than 27 frames/sec. |
| RW | Response to RW command, issued when speed is greater than 60 frames/sec. |
| ST | Response to ST command, issued when speed is less than 4.7 frames/sec. |

The interface 20, of course, knows the speed of the video recorder because it is monitoring the control pulse line 40 from the video equipment 28.

The following monitor 26 control commands are provided:

| Command | Action |
|---------|--------|
| VC | Computer Video to monitor through relay 92. |
| VR | Recorder Video to monitor through relay 94. |
| VO | Video Off (no video to monitor); relays 92 and 94 off. |
| AB | Both Audio channels to monitor; relays 80 and 82 on. |
| AO | Audio Off (no audio to monitor); relays 80 and 82 off. |
| AS | Audio Sound to monitor through relay 82. |
| AD | Audio Data to monitor through relay 80. |

It should be noted that we have labeled one of the two sound channels of the video equipment 28 as "sound" and the other as "data", as we use one channel to record data, that being the record and frame identifying indicia previously mentioned.

Output Line Assignments

Output line assignment commands are provided so that the host computer 22 can set up its own line assignment table into the RAM 34; that is, the interface 20 can be programmed to supply any command signal on and to receive a Mode Read signal on any selected ones of the central lines 36. This of course can be done by use of the keyboard 40 or by previously recorded commands in the host computer's program. The output line assignment commands are divided into 6 sets of commands: ZA, ZB, ZC, ZD, ZE and ZF, each followed by a space and eight two digit line numbers. These are:

ZA aa bb cc dd ee ff gg hh
  where:
  aa-line number assigned to function P(1) ... STOP
  bb-line number assigned to function P(2) ... STOP READ
  cc-line number assigned to function P(3) ... PLAY
  dd-line number assigned to function P(4) ... PLAY READ
  ee-line number assigned to function P(5) ... FAST FORWARD
  ff-line number assigned to function P(6) ... FF READ
  gg-line number assigned to function P(7) ... REWIND
  hh-line number assigned to function P(8) ... RW READ ZB aa bb cc dd ee ff gg hh
  where:
  aa-line number assigned to function P(9) ... PAUSE
  bb-line number assigned to function P(10) ... PAUSE READ
  cc-line number assigned to function P(11) ... DUB
  dd-line number assigned to function P(12) ... DUB READ
  ee-line number assigned to function P(13)
  ff-line number assigned to function P(14)
  gg-line number assigned to function P(15)
  hh-line number assigned to function P(16)

ZC aa bb cc dd ee ff gg hh
  where:
  aa-line number assigned to function P(17)
  bb-line number assigned to function P(18)
  cc-line number assigned to function P(19)
  dd-line number assigned to function P(20)
  ee-line number assigned to function P(21)
  ff-line number assigned to function P(22)
  gg-line number assigned to function P(23)
  hh-line number assigned to function P(24)

ZD aa bb cc dd ee ff gg hh
  where:
  aa-line number assigned to function P(25)
  bb-line number assigned to function P(26)
  cc-line number assigned to function P(27)
  dd-line number assigned to function P(28)
  ee-line number assigned to function P(29)
  ff-line number assigned to function P(30)
  gg-line number assigned to function P(31)
  hh-line number assigned to function P(32)

ZE aa bb cc dd ee ff gg hh
  where:
  aa-line number assigned to function P(33)
  bb-line number assigned to function P(34)
  cc-line number assigned to function P(35)
  dd-line number assigned to function P(36)
  ee-line number assigned to function P(37)
  ff-line number assigned to function P(38)
  gg-line number assigned to function P(39)
  hh-line number assigned to function P(40)

ZF aa bb cc dd ee ff gg hh
  where:
  aa-line number assigned to function P(41)
  bb-line number assigned to function P(42)
  cc-line number assigned to function P(43)
  dd-line number assigned to function P(44)
  ee-line number assigned to function P(45)
  ff-line number assigned to function P(46)
  gg-line number assigned to function P(47)
  hh-line number assigned to function P(48)

The P functions, P(1) through P(48), are referred to as pins in the program of Appendix A. However, the pins referred to are places in the line number assignment table assigned to the functions by the program.

Tape Annotate Command

The tape annotation command AE aaaaaa comprises AE, a space, and a six digit decimal number.

The command AE aaaaaa produces the following sequence of responses:

The recorder is signaled to stop, then to rewind, i.e. 200 millisecond grounds on the stop and then on the rewind control lines.

The frame number register in the interface 20 is cleared to zero.

When no control pulses have been received for 7 seconds the dub and play control lines are grounded for 200 milliseconds. The DATA audio track is encoded with TAPE ID and frame numbers by the tone generator 43 every 10 frames in synchronism with receipt of the recorder's control pulses.

When the frame number to be recorded is equal to or exceeds the target frame aaaaaa, the recorder is signaled to stop.

The interface then signals completion to the host computer with the response: AE.

Other Commands With Target Frames

PP aaaaaa indicates play to target frame aaaaaa and pause. In response to this command, the interface 20 checks to see whether or not the video equipment 28 is in the play mode. If it is not in the PLAY mode the play control line is pulsed. If it is in the play mode, then it repeatedly checks to see if the frame number is equal to or exceeds the target frame aaaaaa. When this is true, is issues a pulse on the pause control line to the video equipment 28.

SP aaaaaa indicates skip to target frame aaaaaa and play. SS aaaaaa indicates skip to target frame aaaaaa and stop. In response to these skip commands, the interface 20 first compares the target frame with the actual position of the tape. If the tape is at a position between 30 and 140 frames before the target frame and not in fast forward or rewind, the interface 20 issues a stop command and the tape will stop within a few frames. If the tape is not within a specified range of frames before the target frame, then the tape is fast forwarded or rewound, depending on whether it is in back of or ahead of this range; fast forward and rewind of course being signaled to the video equipment 28 on the appropriate control line 36.

In rewind the tape will be rewound until the actual frame reaches the lower limit of the range specified before the target frame and the recorder then will be stopped. Because of inertia and the response time of the interface program, the recorder will overshoot before it comes to a halt. the amount of overshoot depends on the tape position. Similarly, in fast forward, the stop signal will be issued to the recorder when the actual frame number is less than the target frame by the largest overshoot that may occur. The amount of overshoot in rewind and fast forward varies from approximately 140 frames to 30 frames in cassette recorders, depending upon where you are in the tape. The range chosen before the target is chosen to equal the same inertial overshoots; that is, in the particular program disclosed herein, for use with cassette video recorders where the overshoot varies from 140 to 30 frames, those numbers are utilized such that if the recorder is within 140 to 30 frames before the target frame, nothing is done except stop it. If it is not, it is fast forwarded to 140 frames before the target frame and stopped and will overshoot by anywhere from 30 to 140 frames. Similarly, in rewind, it will be rewound to 30 frames before the target frame and stopped and will overshoot anywhere from 140 to 30 frames. On the average it will overshoot about 60 frames so that in all events the target frame will come up when the recorder is put into play within half a second, that is, within 30 frames since it takes about 60 frames for video to come up on the monitor after a start signal is supplied to the recorder. Numbers of frames for this braking or stopping range are thus equal to the greatest overshoot in fast forward or rewind at one end of the range, and to the start up slip minus the least overshoot for the other end of the range (60−30=30).

In any event, after the actual frame number reaches the limit of the stopping range before the target frame, if the command received is SKIP PLAY, or if the recorder is in the blank range before the target frame, a play signal will be sent to the video equipment 28 and the SP response will be issued to the host computer 22 when the target frame and the actual frame number are identical. Similarly, in skip stop, if the recorder's actual frame number is within the blank range before the target frame, the stop signal if required, will be issued to the recorder and the recorder will be stopped when the actual frame number is equal to the target frame number.

Thus in fast forward the stop signal is issued in response to the frame number being equal to or greater than the largest overshoot, taking into account the overshoot caused by both the interface and the video source. In rewind, the stop signal is issued in response to the frame number being equal to or less than the start up slip minus the least overshoot, taking into account the overshoot caused by both the interface and the video source. If the video source is within these limits and stopped, the play command is issued and the video source plays. When the target frame is reached, in SP, a pulse is issued on the pause control line; in SS, a pulse is issued on the stop control line.

The interface 20 issues a PP or an SP or an SS response to the host computer 22 when the same commands have been executed. The PP response is issued after the pause signal is sent to the video equipment 28. The SP command is issued immediately after the target frame is reached. The SS command is issued after the stop signal has been sent to the video equipment 28.

Frame Number and ID Commands

The following frame number and ID commands are provided:

| Command | Action |
| --- | --- |
| II aaaaaaaa | Initializes Tape Identification register in the interface to the 8-character |

| Command | Action |
| --- | --- |
| | alphanumeric string aaaaaaaa used to identify a new tape in annotate. Of course if a tape is being played, the Tape Identification register will be reset to the alphanumeric string being read from the tape next time it is read from the tape. |
| IF aaaaaa | Initialize the Frame Number register in the interface to a 6-digit number aaaaaa. This command is used for debugging only. |
| RI | Request tape Identification string. The interface responds with the tape identification number stored in its tape identification register. |
| RF | Request Frame number. The interface responds with the frame number stored in its frame number identification register. |

These commands result in the following responses:

| Response | |
| --- | --- |
| RI aaaaaaaa | Response to RI command, where aaaaaaaa is the tape ID |
| RF aaaaaa | Response to RF command, where aaaaaa is the frame number. |

The following commands provide direct access to the I/O line functions P(I):

| Command | Action |
| --- | --- |
| IS aa | requests the State of the Input line associated with function P (aa). |
| OL aa | sets the Output line associated with line function p (aa) to the Low state. |
| OH aa | sets the Output line associated with line function P (aa) to the High state. |
| OP aa | Pulses the Output line associated with line function P (aa) to the low state for 200 milliseconds. |

The following responses are provided to the IS and OP commands:

| Response | |
| --- | --- |
| IS b | Response to command IS where b indicates the state: b⁻ = 1 when the input is in the high state b = 0 when the input is in the low state. |
| OP | Response to command OP, issued when 200 millisec pulse completed. |

The user may request the status or mode in which the video source is operating by entering "SR" at the host computer. The interface responds SR rr, where rr may be AE, FF, DB, PA, PL, PP, RW, SP, SS, or ST.

An error response ER is provided in response to any command that is not recognized by the unit to be a legitimate command.

The Program

Now referring to FIG. 2A, as indicated on the flow chart at 100, when the interface 20 is turned on, the program initializes the variables, strings, UART's, and interrupts. At this point the program which is stored in the PROM 32 sets up the I/O mapping to the asynchronous interface 60, the relay I/O 84, the frame number bi-directional I/O 72, the control pulse input and conditioning I/O 68, the 48 line bi-directional I/O 64, and the expansion port 46. It also transfers from the PROM to the RAM the particular output line table selected by the dip switch 38. The program then enters the main loop in which it checks essentially every possible condition that the microprocessor could encounter. First it enters a command interpretation phase (COMINT) generally indicated at 102, and if the host computer has sent a command, the command is parsed and the program sets the appropriate flags and output ports for this command, and then returns to the main loop.

Then as generally indicated at 104, three sub-routines, Audio Uart Receiver Main Program Segment (AURMAIN), Frame Number EnCode (FNENCODE), and Frame Number DeCode (FNDECODE) are utilized. As indicated at 106, if dubbing is taking place, the FNDECODE sub-routine generally indicated at 108 is not entered, and the FNENCODE sub-routine indicated at 110 is entered. In the FNENCODE sub-routine 110 the frame number is incremented by ten each time ten frames have been counted since the last increment and the frame number and tape ID are transmitted to the tone generator 43 and thus recorded at the video equipment 28.

If a different, more compact code than ASCII were utilized to record the frame numbers, they could be recorded every frame, in which case the incrementing would occur upon receipt of each frame control pulse at the control pulse and input conditioning circuitry 68.

If dubbing is not taking place, then the FNDECODE sub-routine is entered.

After the AURMAIN FNDECODE and FNENCODE have been executed, the program enters the Host UART Receiver Main program segment (HURMAIN), generally indicated at 120.

In this sub-routine the host UART buffer in the asynchronous interface 60 is checked to see whether another command has been received from the host computer 22. If not, the routine is exited back to the main program at A. If the host UART buffer is ready, that command is placed in a command string which is used the next time the program executes the COMINT sub-routine generally indicated at 102.

Now referring to FIG. 2B, the next subroutine generally indicated at 122 is STOPSET. In this sub-routine, if a stop command has been received from the host computer 22 or is required by another sub-routine, the stop flag has been set, the stop control line 36 is pulsed for 200 microseconds and a reply ST command is sent to the host computer 22. The following sub-routines PLAYSET, generally indicated at 124, FAST FORWARD, generally indicated at 126, REWIND, generally indicated at 128, PAUSE, generally indicated at 130, PAUSE RELEASE, generally indicated at 132, DUB SET, generally indicated at 134, and DUB RELEASE, generally indicated at 136, all operate in a similar way depending on whether their respective flag has been set either by the host computer or by the internal program in the interface 20. (see also FIG. 2C) Although stop commands are issued to the video equipment 28 in these sub-routines where appropriate, e.g., if the machine is in fast forward or rewind and play is requested, this stop command is actually redundant for most of video tape recorders presently in existence which have internal controls which will stop the machine in such situations. However, by including them in the program, they are ready for utilization with video equipment that does not have such internal controls.

The next sub-routine generally indicated at 138 is PLAY PAUSE. This sub-routine executes the play pause to a target, PP aaaaaa, command described above in the section Commands and Responses.

Figure 2D:
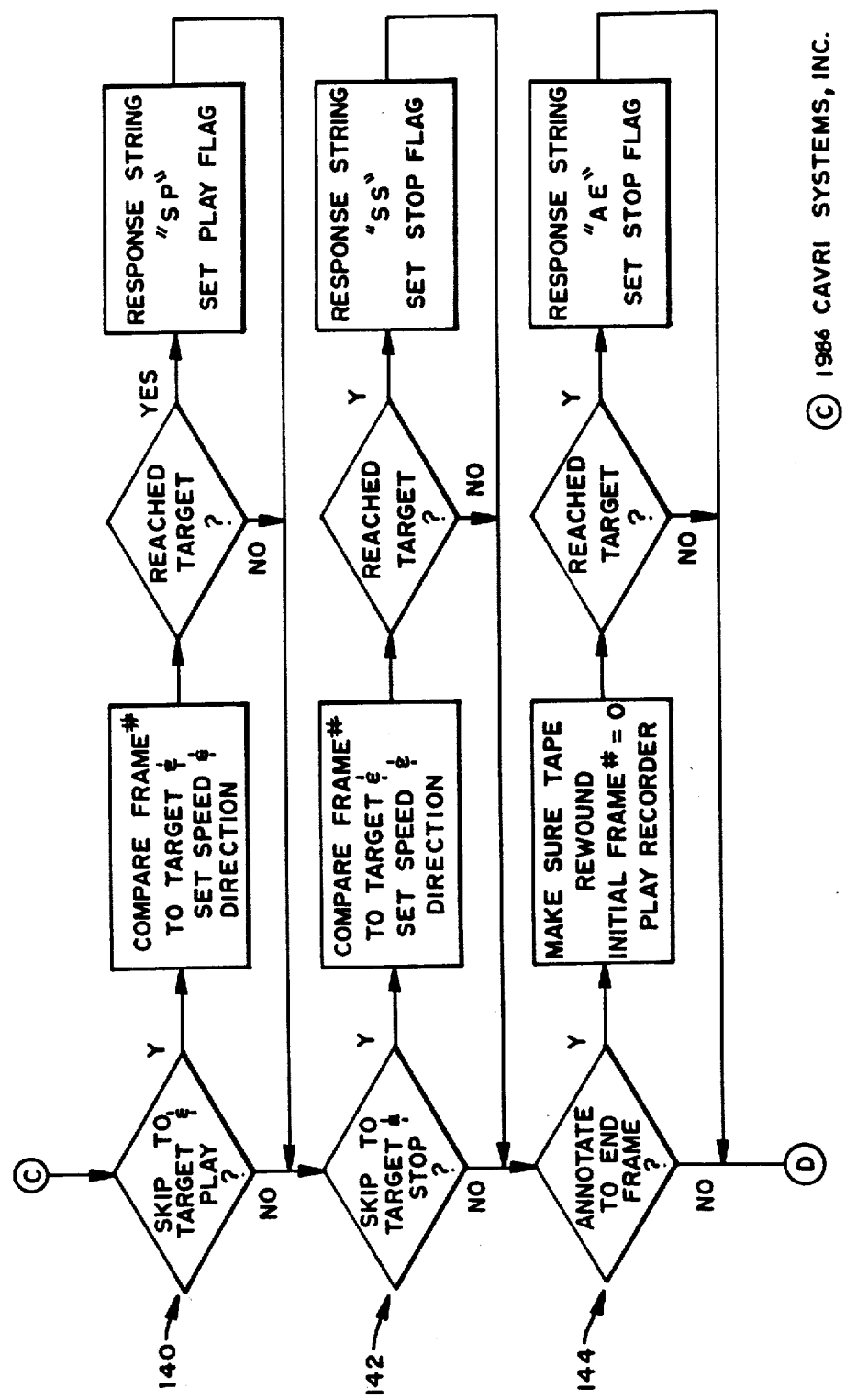

Now referring to FIG. 2D, the next sub-routine is SKIP PLAY, generally indicated at 140 and this is followed by the sub-routine SKIP STOP, generally indicated at 142. These sub-routines respectively respond to the commands SP aaaaaa, and SS aaaaaa, as described in the Commands and Responses section.

The next sub-routine is ANNOTATE, generally indicated at 144, and this sub-routine proceeds as described above in the Commands and Responses section.

The next sub-routines generally indicated at 146 are output pulse associated with the OP command and one shot for generating the 200 millisecond pulses on the control lines 36.

The next sub-routine generally indicated at 148 is called INOUT and controls the 48 line bi-directional I/O 64.

The next sub-routine generally indicated at 150 is called RESPONSE and provides the responses to the host computer which were described in the Commands and Responses section.

The program then returns to the main loop, FIG. 2A.

The interrupt routine is shown in FIGS. 3A and 3B. Now referring to FIG. 3A, the interrupt routine is initiated at 1200 times per second as indicated at 152. A basic purpose of the interrupt routine as shown in FIG. 3A is to count the control pulses and as indicated generally at 154, if the recorder 28 is in fast forward or rewind, the program uses the control pulses divided by ten input from divide-by-ten divider 70. Otherwise it used the control pulses supplied by the machine as indicated at 156 and the control pulses are utilized in fast forward and rewind for locating the recorder in stop between 30 and 140 frames before a desired target frame as discussed in the Commands and Responses section above, and to play to, dub to, or annotate to a particular frame, as also indicated above.

Now referring to FIG. 3B, the portion of the interrupt routine there illustrated checks for other communications between the host computer, the video equipment and the interface 20. Thus the sub-routine generally indicated at 158 checks to see if the program of the interface 20 is ready to transmit a reply to the host computer 22. The sub-routine generally indicated at 160 checks to see if data has been received from the host computer at the asynchronous interface 60. The sub-routine generally indicated at 162 checks to see if the audio UART, that is the frame number bi-directional I/O 72, is ready to send frame number and tape identifying indicia to the tone generator 43. The sub-routine generally indicated at 164 checks to see if data has been received at the frame number bi-directional I/O 72 from the audio tone decoders 42. At the end of the interrupt routine its registers are restored as indicated at 166 and the main program is returned to at the place where it was interrupted.

The interrupt rate of 1200 Hertz is chosen to be greater than the highest rate at which control pulses will be received at the control pulse and input conditioning circuit 68 from the video equipment 28, so that all such signals will be counted in fast forward and rewind.

Additional sub-routines and tables, such as BIT-MASK, Parallel Input (PARIN), Parallel Output (PAROUT), Response Inhibit Test (RESINHIB), Test for Target Frame (TARTEST), Frame Number String Function (NFSTRING), Interrupt Routines (INT38), Control Pulse Service (CPULSE), Host UART Transmitter Service (HXNT), Host UART Receiver Service (HRCVR), Audio Transmitter Service (AXNP), Audio UART Received Service (ARCVR), Return from Interrupt (INT38R), BITMASKY, RESET and IRQ VECTORS, and RAM allocations are utilized as will be apparent to those having ordinary skill in the art.

The Program Listings

The program listings are appended to this specification. They are in source code. Some statements are in BASIC, others in assembly language. The code ASM indicates "start assembly language". The code ENASM indicates "end assembly language". All statements following ASM and before ENASM are in assembly language. All other statements are in BASIC. A "*" indicates a comment on an assembly language statement. A "!" indicates a comment on a BASIC language statement.

It will thus be seen that the objects set forth above among those made apparent from the preceding description, are efficiently attained and, since certain changes may be made in the above system, apparatus, articles and programs without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

```
RUN TIME PROGRAM:
      RTIME.R03

INTERRUPTS:
      NMI NOT USED
      IRQ OCCURS AT A 1200 HZ RATE
      IRQ RESET BY ADDRESSING I/O PORT 0

DURATION OF PASS THROUGH MAIN LOOP:   3 TO 5 MILLI-SEC

VARIABLES, BASIC INTEGERS (2 BYTE)

ANNO .....  ANNOTATE FLAG
         ATIM .....  A DECREMENTING PASS COUNTER, DECREMENTS ONCE PER PASS
                     THROUGH THE MAIN LOOP.
         AURF .....  AUDIO UART RECEIVER FLAG
         AURI .....  AUDIO UART RECEIVER BYTE INDEX
         AUXF .....  AUDIO UART TRANSMIT FLAG
         AUXI .....  AUDIO UART TRANSMIT BYTE INDEX
         BITF .....  BIT FLAG FOR PAROUT ROUTINE
         COMF .....  NEW COMMAND READY FLAG
         DIR  .....  TAPE DIRECTION FLAG
         DUB  .....  DUB STATUS FLAG
         DUBR .....  DUB RELEASE FLAG
         ECNT .....  ERROR COUNT FOR AUDIO UART ERRORS
         HURF .....  HOST UART RECEIVER FLAG
         HURI .....  HOST UART RECEIVER BYTE INDEX
         HUXF .....  HOST UART TRANSMIT FLAG
         HUXI .....  HOST UART TRANSMIT BYTE INDEX
         INCF .....  FRAME NUMBER INCREMENT
         I(0).....   DATA READ FROM DIP SWITCH PORT
         I(2).....   DATA READ FROM PORT 6  (X'06')
         I(3).....   DATA READ FROM PORT 7  (X'07')
         I(4) ....   DATA READ FROM PORT 16 (X'10')
         I(5) ....   DATA READ FROM PORT 17 (X'11')
         I(6) ....   DATA READ FROM PORT 18 (X'12')
         I(7) ....   DATA READ FROM PORT 19 (X'13')
         NFEF .....  FRAME NUMBER ENCODE FLAG USED IN FNENCODE ROUT.
         NFRH .....  FRAME NUMBER HIGH THREE DECADES ( 1 UNIT = 1000 FRAMES ).
         NFRL .....  FRAME NUMBER LOW THREE DECADES ( 1 UNIT = 1 FRAME ).
         OS   .....  ONE SHOT TIMER ( DECREMENTS ON EACH INTERRUPT ).
         OSDE .....  ONE SHOT DECREMENT ( ACCUM'S NO. OF INT'S SINCE LAST PASS).
```

```
OSF ......  ONE SHOT FLAG
OSTA .....  TARGET OFFSET ( 1 UNIT = 1 FRAME )
OST1 .....  TARGET OFFSET FOR PLAYSTOP
OST2 .....  TARGET OFFSET FOR SKIPPLAY FAST FORWARD
OST3 .....  TARGET OFFSET FOR SKIPPLAY REWIND
OST4 .....  TARGET OFFSET FOR SKIPSTOP FAST FORWARD
OST5 .....  TARGET OFFSET FOR SKIPSTOP REWIND
OST6 .....  TARGET OFFSET FOR PLAYPAUS
OUPI .....  OUTPUT PIN
OUPU .....  OUTPUT PULSE STATUS FLAG
O(1) .....  OUTPUT DATA FOR ANALOG SWITCH PORT (X'01')
O(2) .....  OUTPUT DATA FOR PORT 2  (X'02')
O(3) .....  OUTPUT DATA FOR PORT 3  (X'03')
O(4) .....  OUTPUT DATA FOR PORT 16 (X'10')
O(5) .....  OUTPUT DATA FOR PORT 17 (X'11')
O(6) .....  OUTPUT DATA FOR PORT 18 (X'12')
O(7) .....  OUTPUT DATA FOR PORT 19 (X'13')
PAUS .....  PAUSE STATUS FLAG
PFI ......  PIN FUNCTION INDEX
PIN ......  I/O PIN NUMBER CARRIED INTO BITMASK ROUTINE
PINA .....  OUTPUT PIN FOR SOFTWARE ONESHOT
PLAY .....  PLAY STATUS FLAG
PLPA .....  PLAY TO TARGET AND PAUSE FLAG
PLST .....  PLAY TO TARGET AND STOP FLAG
PREL .....  PAUSE RELEASE FLAG
P(1) .....  I/O PIN ASSIGNED TO "STOP"
P(2) .....  I/O PIN ASSIGNED TO "STOP READ"
P(3) .....  I/O PIN ASSIGNED TO "PLAY"
P(4) .....  I/O PIN ASSIGNED TO "PLAY READ"
P(5) .....  I/O PIN ASSIGNED TO "FAST FORWARD"
P(6) .....  I/O PIN ASSIGNED TO "FF READ"
P(7) .....  I/O PIN ASSIGNED TO "REWIND"
P(8) .....  I/O PIN ASSIGNED TO "RW READ"
P(9) .....  I/O PIN ASSIGNED TO "PAUSE"
P(10) ....  I/O PIN ASSIGNED TO "PAUSE READ"
P(11) ....  I/O PIN ASSIGNED TO "DUB"
P(12) ....  I/O PIN ASSIGNED TO "DUB READ"
P(13 THRU 48) ... UNASSIGNED I/O PIN FUNCTIONS
RW .......  REWIND STATUS FLAG
SKPL .....  SKIP TO TARGET AND PLAY STATUS FLAG
SKST .....  SKIP TO TARGET AND STOP STATUS FLAG
SLEW .....  FAST FORWARD STATUS FLAG
STP ......  STOP STATUS FLAG
TARF .....  TARGET TEST RESULT FLAG
TFNL .....  TARGET FRAME NUMBER, LOW THREE DECADES
TFNH .....  TARGET FRAME NUMBER, HIGH THREE DECADES
TIMF .....  FRAME TIME INTERVAL
X ........  UTILITY VARIABLE
Y ........  UTILITY VARIABLE

VARIABLES: BASIC STRINGS

AE$ ......  ANNOTATE RESPONSE
    AUR$ .....  AUDIO UART RECEIVER STRING  ( MAX LENGTH = 16 )
    AUX$ .....  AUDIO UART TRANSMIT STRING  ( MAX LENGTH = 16 )
    COM$ .....  COMMAND STRING              ( MAX LENGTH = 30 )
    DB$ ......  DUB RESPONSE
    DR$ ......  DUB RELEASE RESPONSE
    FF$ ......  FAST FORWARD RESPONSE
    ER$ ......  ERROR RESPONSE
    HUR$ .....  HOST UART RECEIVER STRING   ( MAX LENGTH = 30 )
    HUX$ .....  HOST UART TRANSMIT STRING   ( MAX LENGTH = 16 )
    IS$ ......  INPUT STATE RESPONSE STRING ( MAX LENGTH = 6 )
```

```
NF$  ......  FRAME NUMBER              ( MAX LENGTH = 16 )
OP$  ......  OUTPUT PULSE RESPONSE
PA$  ......  PAUSE RESPONSE
PL$  ......  PLAY RESPONSE
PP$  ......  PLAY PAUSE RESPONSE
PR$  ......  PAUSE RELEASE RESPONSE
RI$  ......  REQUEST ID RESPONSE       ( MAX LENGTH = 12 )
RF$  ......  REQUEST FRAME NO. RESPONSE ( MAX LENGTH = 12 )
RW$  ......  REWIND RESPONSE
SP$  ......  SKIP PAUSE RESPONSE
SS$  ......  SKIP STOP RESPONSE
ST$  ......  STOP RESPONSE
SR$  ......  STATUS REQUEST RESPONSE   ( MAX LENGTH = 6 )
TID$ ......  TAPE I.D.                 ( MAX LENGTH = 8 )
X$   ......  UTILITY STRING            ( MAX LENGTH = 10 )
Y$   ......  UTILITY STRING            ( MAX LENGTH = 10 )
```

VARIABLES, ASSEMBLY LANGUAGE

SEE DEFINED STORAGE STATEMENT AT END OF PROGRAM

I/O MAPPING:

| I/O ADDR | FUNCTION |
|---|---|
| X'00' | IRQ RESET |
| X'01' | O(1) (ANALOG SWITCHES) |
| X'02' | O(2) ( I/O PINS 2,4,6,8,10,12,14,16 ) |
| X'03' | O(3) ( I/O PINS 1,3,5,7,9,11,13,15 ) |
| X'04' | I(0)( DIP SWITCH/CP BYTE ) |
| X'05' | NOT USED |
| X'06' | I(2) (SAME I/O PINS AS OUT2) |
| X'07' | I(3) (SAME I/O PINS AS OUT3) |
| X'10' TO X'1F' | EXPANSION DEVICE 1 |
| X'10' | I(4), O(4) ( I/O PINS 18,20,22,24,26,28,30,32 ) |
| X'11' | I(5), O(5) ( I/O PINS 17,19,21,23,25,27,29,31 ) |
| X'12' | I(6), O(6) ( I/O PINS 34,36,38,40,42,44,46,48 ) |
| X'13' | I(7), O(7) ( I/O PINS 33,35,37,39,41,43,45,47 ) |
| X'20' TO X'2F' | EXPANSION DEVICE 2 |
| X'30' TO X'3F' | EXPANSION DEVICE 3 |
| X'40' TO X'4F' | EXPANSION DEVICE 4 |
| X'50' TO X'5F' | NOT USED |
| X'60' | AUDIO UART DATA |
| X'61' | AUDIO UART MODE/COMMAND |
| X'62' TO X'6F' | NOT USED |
| X'70' | HOST UART DATA |
| X'71' | HOST UART MODE/COMMAND |
| X'72' TO X'FF' | NOT USED |

ANALOG SWITCH BIT MAP:

| BIT | FUNCTION | | |
|---|---|---|---|
| 0 | PLAYER VIDEO | 1=ON | |
| 1 | COMPUTER VIDEO | 1=ON | |
| 2 | SOUND AUDIO | 1=ON | |
| 3 | DATA AUDIO | 1=ON | (DUD CHAN) |
| 4 THRU 7 | NOT USED | | |

I/O PINS BIT MAP:

SEE TABLES "BITMASKY" AND "BITPORT" AT END OF PROGRAM
        BITMASKY INDICATES THE BIT POSITION ON THE DATA BUS,
        BITPORT INDICATES THE I/O PORT NUMBER.

DIP SWITCH BIT MAP:

THE ON/OFF POLARITIES LISTED BELOW HAVE BEEN SELECTED TO AGREE WITH
        THE SENSE THAT A USER WOULD PERCEIVE UPON EXAMINATION OF THE
        MARKINGS ON THE CIRCUIT BOARD. THE POLARITIES MAY NOT BE
        SELF EVIDENT, BUT AT LEAST THEY WILL BE CONSISTENT AND WILL
        NOT BE COUNTER-INTUITIVE.

IN THE NEW LAYOUT, THE DIP SWITCH NUMBER IS IDENTICAL TO THE BIT
        POSITION ON THE DATA BUS (I.E. SWITCH SECTION 1 = D1)

SWITCH = ON ..... GIVES ...... DATA BIT = 0

| SWITCH SECTION | FUNCTION | | | SENSE |
|---|---|---|---|---|
| 0 | CONTROL PULSE | (NOT A DIP SWITCH SETTING) | | |
| 1 | FRAME/FIELD | ON = A CONTROL PULSE PER FRAME | | INV |
| 2 | 8/7 BITS | ON = 8 BIT DATA WORD (HOST UART) | | INV |
| 3 | CNTRL PULSE * 1/10 | (NOT A DIP SWITCH SETTING) | | |
| 4 | PARITY | ON = NO PARITY | | NORM |
| 5 | UNASSIGNED | | | |
| 6 | EVEN/ODD PARITY | ON = EVEN PARITY | | INV |
| 7 | STOP BITS | ON = 1 STOP | OFF = 2 STOPS | NORM |

UART MODE WORD BIT MAP:

| | |
|---|---|
| 1X BAUD RATE | D1D0 = 01 |
| 16X BAUD RATE | D1D0 = 10 |
| LENGTH = 7 | D3D2 = 10 |
| LENGTH = 8 | D3D2 = 11 |
| PARITY ON | D4 = 1 |
| EVEN PARITY | D5 = 1 |
| 1 STOP BIT | D7D6 = 01 |
| 2 STOP BITS | D7D6 = 11 |

UART COMMAND WORD BIT MAP:

| BIT | FUNCTION | | | |
|---|---|---|---|---|
| 0 | TRANSMITTER | 1 = ENABLE | 0 = DISABLE | |
| 1 | DTR | 1 = ACTIVE | | |
| 2 | RECEIVER | 1 = ENABLE | 0 = DISABLE | |
| 3 | BREAK | 1 = BREAK | 0 = NORMAL | |
| 4 | RESET ERROR FLAGS | 1 = RESET | | |
| 5 | RTS | 1 = ACTIVE | | |
| 6 | INTERNAL RESET | 1 = ACTIVE | (NEXT BYTE IS MODE BYTE) | |
| 7 | HUNT | 1 = ACTIVE | (NOT USED) | |

ASM

*****************************************************************

DIMENSION STRINGS AND VARIABLES

```
        ENDASM

DIM     AUR$(16), AUX$(16), COM$(30), NF$(16)
        DIM     HUR$(30), HUX$(16)
        DIM     TID$(9), Y%(10), Y$(10)

DIM     AE$(2), DH$(2), DR$(2), FF$(2), ER$(2), IS$(6), OP$(2), PA$(2)
        DIM     PL$(2), PP$(2), PR$(2), RW$(2), SP$(2), SR$(6), SS$(2), ST$(2)
        DIM     RI$(12), RF$(12)

DIM     P(48), O(7), I(7)

ASM
*
*********************************************************************
*
* DEFINE A COUPLE OF BASIC VARIABLES WITH DUMMY STATEMENTS
*
        ENDASM
        AUXI = 0
        HUXI = 0
        ASM
*
*********************************************************************
*
* INITIALIZATION
*
INITIAL OR      A
*
        LD      HL,X'3000'              ZERO BOTTOM 1001 BYTES OF RAM
        LD      (HL),0
        LD      DE,X'3001'
        LD      BC,1000
        LDIR
*
        ENDASM
!
        O(1) = 16R02                    !! COMPUTER VIDEO ON, AUDIO ALL OFF
        O(2) = 0                        !! ALL 48 OPEN-COLLECTOR OUTPUTS HIGH
        O(3) = 0                        !!      (REMEMBER THAT OUTPUT INVERTS)
        O(4) = 0
        O(5) = 0
        O(6) = 0
        O(7) = 0
!
        ASM
*
        LD      A,2
        LD      (VAE$),A
        LD      (VDR$),A
        LD      (VDH$),A
        LD      (VFF$),A
        LD      (VER$),A
        LD      (VOP$),A
        LD      (VPA$),A
        LD      (VPL$),A
        LD      (VPP$),A
        LD      (VPR$),A
        LD      (VRW$),A
```

```
LD      (VSP$),A
LD      (VSS$),A
LD      (VST$),A

LD      A,6
LD      (VIS$),A
LD      (VSR$),A

LD      A,8
LD      (VTID$),A
LD      (VPE$),A

LD      A,10
LD      (VX$),A
LD      (VY$),A

LD      A,12
LD      (VRI$),A
LD      (VRF$),A

LD      A,16                    INITIALIZE THE MAXLENGTH BYTES OF ALL
LD      (VAUR$),A                   THE STRINGS IN RAM.
LD      (VAUX$),A
LD      (VNF$),A
LD      (VHUX$),A

LD      A,30
LD      (VCOM$),A
LD      (VHUR$),A

ENDASM                          ;! INITIALIZE THE TAPE ID WITH A DUMMY
TID$ = "TAPE..ID"               ;!    STRING SO THE ANNOTATE ROUTINE
ASM                                   WILL WORK W/O A TAPE ID.
```

CONSTRUCT THE HOST UART MODE WORD "HUMODE"

```
IN      A,(4)                   READ THE DIP SWITCH
XOR     X'46'                   INVERT TO CORRECT SENSE, MASK = 0100 0110

AND     X'40'                   SELECT THE EVEN/ODD PARITY AT POSITION 6
RRCA                            ROTATE RIGHT TO POSITION 5
LD      (HUMODE),A              WRITE EVEN/ODD BIT TO "HUMODE"

IN      A,(4)                   READ THE DIP SWITCH AGAIN
XOR     X'46'                   INVERT TO CORRECT SENSE AGAIN
AND     X'94'                   SELECT THE REMAINING MODE BITS
                                    MASK = 1001 0100
OR      X'4A'                   SET THE BITS THAT ARE ALWAYS TO BE SET
                                    MASK = 0100 1010 (CSLN71 PG 14)

LD      HL,HUMODE               OR REG-A WITH HUMODE.
OR      (HL)
LD      (HUMODE),A
```

INITIALIZE "FRAME" PER DIP SWITCH SETTING AND LOAD THE CORRESPONDING DEFAULT
   PIN FUNCTIONS TABLE.

```
IN      A,(4)                   READ DIP SWITCH.
XOR     X'46'                   INVERT TO CORRECT SENSE.
AND     2                       SELECT THE FRAME/FIELD BIT.
```

```
        LD      (FRAME),A
        JP      Z,L361
*
!
!       ENDASM
!
!       DEFAULT PIN FUNCTIONS WHEN FRAME = 1    (1 CP/FRAME)
!               ( PANASONIC NV-8200 VCR )

P(1)    =       5                       !! STOP
        P(2)    =       5                       !! STOP READ
        P(3)    =       2                       !! PLAY
        P(4)    =       24                      !! PLAY READ
        P(5)    =       3                       !! FAST FORWARD
        P(6)    =       25                      !! FAST FORWARD READ
        P(7)    =       4                       !! REWIND
        P(8)    =       26                      !! REWIND READ
        P(9)    =       7                       !! PAUSE
        P(10)   =       7                       !! PAUSE READ
        P(11)   =       6                       !! DUB
        P(12)   =       6                       !! DUB READ
        FOR I = 13 TO 48
        P(I) = 99
        NEXT I
        GOTO 362

!
!       DEFAULT PIN FUNCTIONS WHEN FRAME = 0    (1 CP/FIELD)
!
!               ( SONY SLP-300/303, SLO-320/323, SLO-383, VO-2860A )
!
361     P(1)    =       8                       !! STOP
        P(2)    =       8                       !! STOP READ
        P(3)    =       13                      !! PLAY
        P(4)    =       13                      !! PLAY READ
        P(5)    =       12                      !! FAST FORWARD
        P(6)    =       12                      !! FAST FORWARD READ
        P(7)    =       11                      !! REWIND
        P(8)    =       11                      !! REWIND READ
        P(9)    =       9                       !! PAUSE
        P(10)   =       9                       !! PAUSE READ
        P(11)   =       6                       !! DUB
        P(12)   =       6                       !! DUB READ
!
        FOR I = 13 TO 48                        !! INITIALIZE PIN FUNCTION VARIABLES
!                                                  P(13) THROUGH P(48)
        P(I) = 99
        NEXT I
!
362     FOR I = 1 TO 100                        !! INITIALIZE UARTS 100 TIMES
!
        ASM
        LD      A,0                             WRITE DUMMY COMMANDS TO UARTS TO BE
        OUT     (X'71'),A                           CERTAIN THAT THE NEXT BYTE WILL BE
        OUT     (X'61'),A                           TREATED AS A COMMAND RATHER THAN
*                                                   A MODE WORD.
        LD      A,X'40'                         WRITE A RESET COMMAND TO BOTH UARTS
        OUT     (X'71'),A                           SO THAT THE NEXT BYTE WILL BE TREATED
        OUT     (X'61'),A                           AS A MODE WORD.
*
        LD      A,(HUMODE)                      SET THE HOST UART FOR:
        OUT     (X'71'),A                           TRANSMITTER ENABLED     DO
```

```
          LD      A,X'37'                 RECEIVER ENABLED        D2
          OUT     (X'71'),A               ERROR FLAGS RESET       D4
*
*
          LD      A,X'FA'         SET THE AUDIO UART FOR:
          OUT     (X'61'),A               2 STOPS                 D7D6
          LD      A,X'14'                 EVEN PARITY             D5
          OUT     (X'61'),A               PARITY ON               D4
*                                         LENGTH = 7              D3D2
*                                         16X BAUD RATE           D1D0
*                                         RESET ERROR FLAGS       D4
*                                         RECEIVER ENABLED        D2
*                                         TRANSMITTER DISABLED    D0
          ENDASM
          NEXT I
!
!         INITIALIZE UART BYTE INDEXES
!
          HURI = 1
          AURI = 1
          HUXI = 2
          AUXI = 2
!
!         DEFAULT SETTINGS FOR TARGET OFFSET CONSTANTS
!
          OST1 =     0            !! PLAYSTOP
          OST2 =  -140             !! FASTFORW IN SKIPPLAY
          OST3 =   -30             !! REWIND   IN SKIPPLAY
          OST4 =  -140             !! FASTFORW IN SKIPSTOP
          OST5 =   -30             !! REWIND   IN SKIPSTOP
          OST6 =     0            !! PLAYPAUSE
!
          STP = 1                 !! SEND A STOP COMMAND
!
          ASM
L369      IM      1               SELECT INTERRUPT MODE 1
          EI                      ENABLE INTERRUPT
*
************************************************************************
*
* MAIN LOOP
*
MAINLOOP  CALL    COMINT
          CALL    FNENCODE
          CALL    FNDECODE
          CALL    AURMAIN
          CALL    HURMAIN
          CALL    STOPSET
          CALL    PLAYSET
          CALL    FASTFORW
          CALL    REWIND
          CALL    PAUSE
          CALL    PAUSREL
          CALL    DUPSET
          CALL    DUPREL
          CALL    PLAYPAUS
          CALL    SKIPPLAY
          CALL    SKIPSTOP
          CALL    ANNOTATE
          CALL    OUTPULSE
```

```
        CALL   ONESHOT
        CALL   INOUT
        CALL   RESPONSE
        JP     MAINLOOP
*
*****************************************************************
*
* COMMAND INTERPRETATION
*
* BASIC INPUTS:   COMF ..... COMMAND FLAG
*                            0 = COMMAND STRING TAKEN
*                            1 = NEW COMMAND READY
*                 COMF IS SET BY "HURMAIN" WHEN A NEW COM$ IS LOADED,
*                 AND IS RESET BY "COMINT" WHEN COM$ IS ACTED UPON.
*                 COM$ ..... COMMAND WORD
*                 DIR, TID$, NFRL, NFRH
* BASIC OUTPUTS:  ( PUT THEM IN LATER )
*
COMINT  OR     A
        ENDASM
        IF COMF<>1 THEN RETURN      :! IF: COM$ NOT NEW     THEN: RETURN
        COMF = 0                    :! ELSE: RESET THE COMMAND FLAG AND
                                    :!        BEGIN DECODING
!
        ERRF = 1                    :! SET THE ERROR FLAG. IT WILL BE RESET
!                                   :!   IN SUBR "COMTEST" BELOW IF IT
!                                   :!   IS RECOGNIZED AS A VALID COMMAND
!                                   :!   CODE.
        ASM
        LD     DE,'AB'              IF COM$="AB" THEN CALL COMAB
        CALL   COMTEST
        CALL   Z,COMAB
*
        LD     DE,'AE'              IF LEFT(COM$,2)="AE" THEN CALL COMAE
        CALL   COMTEST
        CALL   Z,COMAE
*
        LD     DE,'AS'              IF COM$="AS" THEN CALL COMAS
        CALL   COMTEST
        CALL   Z,COMAS
*
        LD     DE,'AD'              IF COM$="AD" THEN CALL COMAD
        CALL   COMTEST
        CALL   Z,COMAD
*
        LD     DE,'AO'              IF COM$="AO" THEN CALL COMAO
        CALL   COMTEST
        CALL   Z,COMAO
*
        LD     DE,'DB'              IF COM$="DB" THEN CALL COMDB
        CALL   COMTEST
        CALL   Z,COMDB
*
        LD     DE,'DR'              IF COM$="DR" THEN CALL COMDR
        CALL   COMTEST
        CALL   Z,COMDR
*
        LD     DE,'FF'              IF COM$="FF" THEN CALL COMFF
        CALL   COMTEST
        CALL   Z,COMFF
```

```
LD      DE,'II'                 IF LEFT(COM$,2)="II" THEN CALL COMII
CALL    COMTEST
CALL    Z,COMII

LD      DE,'IF'                 IF LEFT(COM$,2)="IF" THEN CALL COMIF
CALL    COMTEST
CALL    Z,COMIF

LD      DE,'IS'                 IF COM$="IS" THEN CALL COMIS
CALL    COMTEST
CALL    Z,COMIS

LD      DE,'OL'                 IF LEFT(COM$,2)="OL" THEN CALL COMOL
CALL    COMTEST
CALL    Z,COMOL

LD      DE,'OH'                 IF LEFT(COM$,2)="OH" THEN CALL COMOH
CALL    COMTEST
CALL    Z,COMOH

LD      DE,'OP'                 IF LEFT(COM$,2)="OP" THEN CALL COMOP
CALL    COMTEST
CALL    Z,COMOP

LD      DE,'PA'                 IF COM$="PA" THEN CALL COMPA
CALL    COMTEST
CALL    Z,COMPA

LD      DE,'PE'                 IF COM$="PE" THEN CALL COMPE
CALL    COMTEST
CALL    Z,COMPE

LD      DE,'PL'                 IF COM$="PL" THEN CALL COMPL
CALL    COMTEST
CALL    Z,COMPL

LD      DE,'PP'                 IF LEFT(COM$,2)="PP" THEN CALL COMPP
CALL    COMTEST
CALL    Z,COMPP

LD      DE,'PR'                 IF COM$="PR" THEN CALL COMPR
CALL    COMTEST
CALL    Z,COMPR

LD      DE,'RI'                 IF COM$="RI" THEN CALL COMRI
CALL    COMTEST
CALL    Z,COMRI

LD      DE,'RF'                 IF COM$="RF" THEN CALL COMRF
CALL    COMTEST
CALL    Z,COMRF

LD      DE,'RW'                 IF COM$="RW" THEN CALL COMRW
CALL    COMTEST
CALL    Z,COMRW

LD      DE,'SP'                 IF LEFT(COM$,2)="SP" THEN CALL COMSP
CALL    COMTEST
CALL    Z,COMSP
```

```
        LD      DE,'SR'         IF COM$="SR" THEN CALL COMSR
        CALL    COMTEST
        CALL    Z,COMSR
*
        LD      DE,'SS'         IF LEFT(COM$,2)="SS" THEN CALL COMSS
        CALL    COMTEST
        CALL    Z,COMSS
*
        LD      DE,'ST'         IF COM$="ST" THEN CALL COMST
        CALL    COMTEST
        CALL    Z,COMST
*
        LD      DE,'VC'         IF COM$="VC" THEN CALL COMVC
        CALL    COMTEST
        CALL    Z,COMVC
*
        LD      DE,'VR'         IF COM$="VR" THEN CALL COMVR
        CALL    COMTEST
        CALL    Z,COMVR
*
        LD      DE,'VO'         IF COM$="VO" THEN CALL COMVO
        CALL    COMTEST
        CALL    Z,COMVO
*
        LD      DE,'ZA'         IF LEFT(COM$,2)="ZA" THEN CALL COMZA
        CALL    COMTEST
        CALL    Z,COMZA
*
        LD      DE,'ZB'         IF LEFT(COM$,2)="ZB" THEN CALL COMZB
        CALL    COMTEST
        CALL    Z,COMZB
*
        LD      DE,'ZC'         IF LEFT(COM$,2)="ZC" THEN CALL COMZC
        CALL    COMTEST
        CALL    Z,COMZC
*
        LD      DE,'ZD'         IF LEFT(COM$,2)="ZD" THEN CALL COMZD
        CALL    COMTEST
        CALL    Z,COMZD
*
        LD      DE,'ZE'         IF LEFT(COM$,2)="ZE" THEN CALL COMZE
        CALL    COMTEST
        CALL    Z,COMZE
*
        LD      DE,'ZF'         IF LEFT(COM$,2)="ZF" THEN CALL COMZF
        CALL    COMTEST
        CALL    Z,COMZF
*
        RET                     COMINT EXIT POINT WHEN COMMAND WAS NOT
*                                 RECOGNIZED.
*
COMTEST LD      A,(VCOM$+2)     COMPARE THE FIRST TWO CHARACTERS OF COM$
        LD      H,A               WITH THE CHARACTER CODE BROUGHT IN
        LD      A,(VCOM$+3)       VIA THE "DE" REGISTER.
        LD      L,A
        OR      A
        SBC     HL,DE
        JP      NZ,COMTEST1
        LD      A,0
```

```
          LD        (VERRF),A
COMTEST1  RET
*
COMAB     EQU       *                              BOTH AUDIO CHAN'S ON
          ENDASM
          O(1) = O(1) OR 16ROC
          ASM
          RET
*
COMAE     CALL      L1040                          ANNOTATE TO END FRAME
          LD        A,(VERRF)            (ERRF WILL HAVE BEEN
          OR        A                     RESET IN "COMTEST"
          RET       NZ                    AND MAY HAVE BEEN SET
          CALL      L1060                 AGAIN IN "L1040")
          ENDASM
          ANNO = 1
          ASM
          RET
*
COMAS     EQU       *                              SOUND ON, DATA OFF
          ENDASM
          O(1) = O(1) OR 16R04
          O(1) = O(1) AND 16RF7
          ASM
          RET
*
COMAD     EQU       *                              DATA ON, SOUND OFF
          ENDASM
          O(1) = O(1) OR  16R08
          O(1) = O(1) AND 16RFB
          ASM
          RET
*
COMAO     EQU       *                              BOTH AUDIO CHAN'S OFF
          ENDASM
          O(1) = O(1) AND 16RF3
          ASM
          RET
*
COMDB     OR        A                              TURN ON AUDIO DUBBING
          ENDASM
          DUB = 1
          ASM
          RET
*
COMDR     OR        A                              DUB RELEASE
          ENDASM
          DUBR = 1
          ASM
          RET
*
COMFF     OR        A                              FAST FORWARD
          ENDASM
          GOSUB 1060
          SLEW = 1
1001      IF DIR=-1 THEN STP=1
          ASM
          RET
*
COMII     OR        A                              INITIALIZE TAPE I.D. NO.
```

```
              ENDASM
1002          IF LEN(COM$)<12 THEN ERRF=1 : RETURN
              TID$ = MID(COM$,4,8)
              ASM
              RET
*
COMIF         OR       A                                  INITIALIZE FRAME NUMBER
              ENDASM
1003          IF LEN(COM$)<10 THEN ERRF=1 : RETURN
              X$ = MID(COM$,4,3)
              NFRH = VAL(X$)
              X$ = MID(COM$,7,3)
              NFRL = VAL(X$)
              ASM
              RET
*
COMIS         OR       A                                  INPUT STATE REQUEST
              ENDASM
              GOSUB 1050
1004          IF ERRF=1 THEN RETURN
              PIN = P(PFI)
              ASM
              CALL PARIN
              ENDASM
              X = 0
1005          IF BITF=0 THEN X=1           ::      INVERSION
!!!!!!        IS$ = "IS " + STR(X)
              ASM
              LD       HL,VIS$+1
              LD       (HL),4
              INC      HL
              LD       (HL),'I'
              INC      HL
              LD       (HL),'S'
              INC      HL
              LD       (HL),' '
              INC      HL
              LD       A,(VX)
              OR       X'30'              CHAR(16R30)=0, CHAR(16R31)=1
              LD       (HL),A
              RET
*
COMOL         OR       A                                  OUTPUT A LOW
              ENDASM
              GOSUB 1050
1006          IF ERRF=1 THEN RETURN
              PIN = P(PFI)
              BITF = 1
              ASM
              CALL PAROUT
              RET
*
COMOH         OR       A                                  OUTPUT A HIGH
              ENDASM
              GOSUB 1050
1007          IF ERRF=1 THEN RETURN
              PIN = P(PFI)
              BITF = 0
              ASM
              CALL PAROUT
```

```
         RET
*
COMOP    OR      A                                  OUTPUT A PULSE
         ENDASM
         GOSUB 1050
1008     IF ERRF=1 THEN RETURN
         OUPI = P(PFI)
         OUPU = 1
         ASM
         RET
*
COMPA    OR      A                                  PAUSE
         LD      A,1
         LD      (VPAUS),A
         XOR     A
         LD      (VSKPL),A
         LD      (VSKST),A
         LD      (VPLPA),A
         RET
*
COMPE    EQU     *                                  PEEK
         ENDASM
         IF LEN(COM$)<9 THEN ERRF=1 : RETURN
         X$ = MID(COM$,4,5)
         X = VAL(X$)
         X = PEEK(X)
         PE$ = "PE " + STR(X)
         ASM
         RET
*
COMPL    OR      A                                  PLAY
         ENDASM
         GOSUB 1060
         PLAY = 1
1009     IF DIR=-1 THEN STP=1
         ASM
         RET
*
COMPP    OR      A                                  PLAY TO TARGET AND PAUSE
         ENDASM
         GOSUB 1040
1010     IF ERRF=1 THEN RETURN
         GOSUB 1061
         PLPA = 1
         ASM
         RET
*
COMPR    OR      A                                  PAUSE RELEASE
         ENDASM
         PREL = 1
         ASM
         RET
*
COMRI    OR      A                                  REQUEST TAPE I.D. NO.
         ENDASM
         RI$ = "RI " + TID$
         ASM
         RET
*
COMRF    OR      A                                  REQUEST FRAME NO.
```

```
              CALL    NFSTRING
              ENDASM
              RF$ = "RF " + X$
              ASM
              RET
*
COMRW         OR      A                                          REWIND
              ENDASM
              GOSUB   1060
              RW = 1
1012          IF DIR=1 THEN STP=1
              ASM
              RET
*
COMSP         OR      A                                          SKIP TO TARGET AND PLAY
              ENDASM
              GOSUB   1040
1013          IF ERRF=1 THEN RETURN
              GOSUB   1060
              SKPL = 1
              ASM
              RET
*
COMSR         OR      A                                          STATUS REQUEST
              LD      A,5                   LENGTH OF SR$ = 5 BYTES
              LD      (VSR$+1),A
*
              LD      A,'S'
              LD      (VSR$+2),A
              LD      A,'R'
              LD      (VSR$+3),A
              LD      A,' '
              LD      (VSR$+4),A
              LD      (VSR$+5),A
              LD      (VSR$+6),A
*
              CALL    COMSRPL
              CALL    COMSRFF
              CALL    COMSRRW
              CALL    COMSRPA
              CALL    COMSRDR
              CALL    COMSRST
              CALL    COMSRAE
              CALL    COMSRSP
              CALL    COMSRSS
              CALL    COMSRPP
              RET
*
*******       IF ANNO<>0 THEN SR$="SR AE"
COMSRAE       LD      A,(VANNO)
              OR      A
              RET     Z
              LD      A,'A'
              LD      (VSR$+5),A
              LD      A,'E'
              LD      (VSR$+6),A
              RET
*
*******       IF SKPL<>0 THEN SR$="SR SP"
COMSRSP       LD      A,(VSKPL)
```

```
                OR      A
                RET     Z
                LD      A,'S'
                LD      (VSR$+5),A
                LD      A,'P'
                LD      (VSR$+6),A
                RET
*
*******     IF SKST<>0 THEN SR$="SR SS"
COMSRSS         LD      A,(VSKST)
                OR      A
                RET     Z
                LD      A,'S'
                LD      (VSR$+5),A
                LD      A,'S'
                LD      (VSR$+6),A
                RET
*
********    IF PLPA<>0 THEN SR$="SR PP"
COMSRPP         LD      A,(VPLPA)
                OR      A
                RET     Z
                LD      A,'P'
                LD      (VSR$+5),A
                LD      A,'P'
                LD      (VSR$+6),A
                RET
*
********    IF  STP<>0 THEN SR$="SR ST"
COMSRST         LD      A,(VSTP)
                OR      A
                RET     Z
                LD      A,'S'
                LD      (VSR$+5),A
                LD      A,'T'
                LD      (VSR$+6),A
                RET
*
*******     IF PLAY<>0 THEN SR$="SR PL"
COMSRPL         LD      A,(VPLAY)
                OR      A
                RET     Z
                LD      A,'P'
                LD      (VSR$+5),A
                LD      A,'L'
                LD      (VSR$+6),A
                RET
*
*******     IF SLEW<>0 THEN SR$="SR FF"
COMSRFF         LD      A,(VSLEW)
                OR      A
                RET     Z
                LD      A,'F'
                LD      (VSR$+5),A
                LD      A,'F'
                LD      (VSR$+6),A
                RET
*
*******     IF  RW<>0 THEN SR$="SR RW"
COMSRRW         LD      A,(VRW)
```

```
               OR      A
               RET     Z
               LD      A,'R'
               LD      (VSR$+5),A
               LD      A,'W'
               LD      (VSR$+6),A
               RET
*
*******  IF PAUS<>0 THEN SR$="SR PA"
CONSRPA        LD      A,(VPAUS)
               OR      A
               RET     Z
               LD      A,'P'
               LD      (VSR$+5),A
               LD      A,'A'
               LD      (VSR$+6),A
               RET
*
*******  IF DUB<>0 THEN SR$="SR DB"
CONSRDB        LD      A,(VDUB)
               OR      A
               RET     Z
               LD      A,'D'
               LD      (VSR$+5),A
               LD      A,'B'
               LD      (VSR$+6),A
               RET    .   .
*
CONSS          OR      A                              SKIP TO TARGET AND STOP
               ENDASM
               GOSUB 1040
1016           IF ERRF=1 THEN RETURN
               GOSUB 1060
               SKST=1
               ASM
               RET
*
COMST          OR      A                                              STOP
               ENDASM
               GOSUB 1060
               STP = 1
               ASM
               RET
*
COMVC          EQU     *                              VIDEO SWITCHED TO COMPUTER
               ENDASM
               O(1) = O(1) OR   16R02
               O(1) = O(1) AND  16RFE
               ASM
               RET
*
COMVR          EQU     *                              VIDEO SWITCHED TO RECORDER
               ENDASM
               O(1) = O(1) OR   16R01
               O(1) = O(1) AND  16RFD
               ASM
               RET
*
COMVO          EQU     *                                              ALL VIDEO OFF
               ENDASM
```

```
                O(1) = O(1) AND 14BFC
                ASM
                RET
*
COMZA           EQU       *                           PIN NOS. FOR P(1) TO P(8)
                ENDASM
1017            J = 0
                GOSUB 1070
                ASM
                RET
*
COMZB           EQU       *                           PIN NOS. FOR P(9) TO P(16)
                ENDASM
1018            J = 8
                GOSUB 1070
                ASM
                RET
*
COMZC           EQU       *                           PIN NOS. FOR P(17) TO P(24)
                ENDASM
1019            J = 16
                GOSUB 1070
                ASM
                RET
*
COMZD           EQU       *                           PIN NOS. FOR P(25) TO P(32)
                ENDASM
                J = 24
                GOSUB 1070
                ASM
                RET
*
COMZE           EQU       *                           PIN NOS. FOR P(33) TO P(40)
                ENDASM
                J = 32
                GOSUB 1070
                ASM
                RET
*
COMZF           EQU       *                           PIN NOS. FOR P(41) TO P(48)
                ENDASM
                J = 40
                GOSUB 1070
                ASM
                RET
*
                ENDASM
!       SUBROUTINE FOR LOADING THE TARGET FRAME
!
1040    IF LEN(COM$)<10 THEN ERRF=1 : GOTO 1049
        X$ = MID(COM$,4,3)
        TFNH = VAL(X$)
        X$ = MID(COM$,7,3)
        TFNL = VAL(X$)
1049    RETURN
!
!       SUBROUTINE FOR LOADING PIN FUNCTION INDEX
!
1050    IF LEN(COM$)<6 THEN ERRF=1 : GOTO 1059
        X$ = MID(COM$,4,2)
```

```
            PFI = VAL(X$)
1059    RETURN
!
!       SUBROUTINE TO RESET THE CONTROL FUNCTIONS THAT ARE NOT SELF CLEARING
!
        ASM
L1060   XOR     A
        LD      (VPAUS),A
L1061   XOR     A
        LD      (VPLAY),A
        LD      (VSLEW),A
        LD      (VRW),A
        LD      (VSKPL),A
        LD      (VSKST),A
        LD      (VPLPA),A
        LD      (VANNO),A
        ENDASM
        IF DUB=0 THEN RETURN         :! USE DUBREL ROUTINE TO RESET THE DUB
        DUBR = 1                     :!     FLAG BECAUSE IT ALSO RESTORES
        RETURN                       :!     THE AUDIO UART CLOCK TO X16.
!
! SUBROUTINE CALLED TO LOAD PIN NUMBERS TO PIN FUNCTION P(I)
!
1070    IF LEN(COM$)<27 THEN ERRF=1 : RETURN
        FOR I = 1 TO 8
        X = 3*I + 1
        Y$ = MID(COM$,X,2)
        P(I+J) = VAL(Y$)
        NEXT I
        RETURN
!
        ASM
L1099   RET
*
!*********************************************************************
*
* FRAME NUMBER ENCODE
*
* BASIC INPUTS:   DUB ...... DUB FLAG      <>=DUBBING       0=NOT DUBBING
*                 AUXF ..... AUDIO UART TRANSMIT FLAG
*                            0 = TRANSMITTER HAS COMPLETED SENDING STRING
*                            1 = TELLS XMITTER THAT A NEW AUX$ IS READY
*                 NFEF ..... FRAME NUMBER ENCODER FLAG
*                            0 = IT'S TIME TO INCREMENT FRAME NO. BY 10
*                            1 = FRAME NO. HAS BEEN INCREMENTED BY 10
*                 TID$ ..... TAPE I.D. NUMBER
*                 NFRL ..... FRAME NUMBER LOW THREE DECADES
*                 NFRH ..... FRAME NUMBER HIGH THREE DECADES
* BASIC OUTPUTS:  AUX$ ..... AUDIO UART XMIT STRING
*
FNENCODE OR     A
        ENDASM
!
        IF DUB=0 THEN RETURN         :! IF: NOT DUBBING    THEN: EXIT
!
!                                    :! ELSEIF: HOST XMITTER IS SENDING
!                                    :!         A STRING
        IF AUXF<>0 THEN NFEF=0 : RETURN
        IF NFEF<>0 THEN RETURN       :! THEN: RESET THE NFEF FLAG AND EXIT
        AUX$ = NF$                   :! ELSEIF: HOST XMIT IS DONE AND NFEF IS
```

```
                NFRL = NFRL + 10              !!                          RESET

IF NFRL>999 THEN NFRL=NFRL-1000 : NFRH=NFRH+1

ASM
        CALL    NFSTRING
        ENDASM
                                        !!THEN: COPY TO AUX$ THE FRAME NUMBER
        NF$ = TI$ + X$                  !!     PREPARED IN STRING NF$, INCREM
        NFEF = 1                        !!     THE FRAME NUMBER BY 10, PREPARE
        ASM                                    A NEW FRAME NUMBER BY CONCATENAT
        LD      A,16                           ING TAPE I.D. + FRAME NO. +
        LD      (VAUX$+1),A                    "LF" + "CR"; AND SET THE NFEF
        LD      A,X'0A'                        FLAG TO INHIBIT INCREMENTS TO THE
        LD      (VAUX$+16),A                   FRAME NUMBER UNTIL THE NEW
        LD      A,X'0D'                        FRAME NUMBER IS TAKEN BY THE
        LD      (VAUX$+17),A                   TRANSMITTER.
*                                       ELSE: EXIT
*
L429    RET
*
**************************************************************************
*
* FRAME NUMBER DECODE
*
* BASIC INPUTS:  DUB ...... DUB FLAG      <>0=DUBBING       0=NOT DUBBING
*                DIR ...... DIRECTION FLAG  1=FORW  0=STOPPED  -1=REV
*                NFRL ..... FRAME NUMBER LOW THREE DECADES
*                NFRH ..... FRAME NUMBER HIGH THREE DECADES
* ASS'Y INPUTS:  FCOUNT ... FRAME COUNT (8-BIT COUNT INCR ONCE PER FRAME)
*                FCOUNT1 .. READING OF FCOUNT SAVED FROM LAST PASS
* BASIC OUTPUTS: NFRL, NFRH
* ASS'Y OUTPUTS: FCOUNT1
*
FNDECODE OR     A
        ENDASM
        IF DUB<>0 THEN RETURN           !! IF: DUBBING        THEN: EXIT
!
        ASM                             CLEAR THE UPPER BYTE OF INCF
        LD      A,0
        LD      (VINCF+1),A
*
        LD      A,(FCOUNT)              INCF = FCOUNT - FCOUNT1
        LD      HL,FCOUNT1
        SUB     (HL)
        LD      (VINCF),A
*
        ADD     A,(HL)                  FCOUNT1 = FCOUNT     (UPDATE FCOUNT1)
        LD      (HL),A
*
        LD      A,(VDIR)                IF: REWINDING
        OR      A                       THEN: INCF = - INCF
        JP      P,L352
        LD      DE,(VINCF)
        LD      HL,0
        OR      A
        SBC     HL,DE
        LD      (VINCF),HL
*
L352    LD      A,(VSLEW)               IF GOING FF OR REWIND, THEN MULTIPLY
```

```
            LD      HL,VRN              THE FRAME NO. INCREMENT BY 10
            ADD     A,(HL)              BECAUSE THE CONTROL PULSES ARE
            JP      Z,L353              DIVIDED BY TEN IN THE HARDWARE.
            ENDASM
            INCF = 10 * INCF
    !
    353     NFRL = NFRL + INCF
            IF NFRL>999 THEN NFRL=NFRL-1000 : NFRH=NFRH+1
            IF NFRL<0   THEN NFRL=NFRL+1000 : NFRH=NFRH-1
            IF NFRH<0   THEN NFRL=0 : NFRH=0
    !
            ASM
    L359    RET
```

```
*****************************************************************
*
* AUDIO UART RECEIVER MAIN PROGRAM SEGMENT
*
* BASIC INPUTS:   AURF ..... AUDIO UART RECEIVER FLAG
*                            0 = UART CONSTRUCTING A STRING
*                            1 = STRING READY
*                            2 = UART ERROR OR STRING OVERFLOW
*                 AUR$ ..... AUDIO UART RECEIVE STRING
*                 DUB ...... DUB FLAG     >0=DUBBING     0=NOT DUBBING
* BASIC OUTPUTS:  TID$ ..... TAPE I.D. NO.
*                 NFRH ..... FRAME NUMBER, HIGH THREE DECADES
*                 NFRL ..... FRAME NUMBER, LOW THREE DECADES
*                 AURI ..... AUDIO UART RECEIVER BYTE INDEX
*                 ECNT ..... ERROR COUNT (INCREMENTS ON EACH BAD UART READ)
*
AURMAIN     OR      A
            ENDASM
    !
            IF DUB<>0 THEN RETURN           !! IF: DUBBING OR STRING NOT READY
            IF AURF=0 THEN RETURN           !! THEN: EXIT
                                            !! ELSEIF: AN ERROR OCCURRED AT THE UART
            IF AURF=1 THEN 341              !! THEN: RESET THE UART ERROR FLAGS,
            OUT(16R61) = 16R14              !!       INCREMENT THE ERROR COUNTER,
            ECNT = ECNT + 1                 !!       RESET AURF, REINITIALIZE THE
            GOTO 342                        !!       BYTE INDEX, AND RETURN
    !
    341     IF LEN(AUR$)<>16 THEN 342       !! ELSEIF: THERE IS A LENGTH ERROR
                                            !! THEN: RESET AURF, REINITIALIZE THE
                                            !!       BYTE INDEX, AND EXIT
    !
            X$ = MID(AUR$,9,3)              !! ELSE: UPDATE THE FRAME COUNT AND THE
            Y$ = MID(AUR$,12,3)             !!       TAPE I.D. FROM THE UART STRING,
            TID$ = LEFT(AUR$,8)             !!       AND EXIT
            NFRH = VAL(X$)
            NFRL = VAL(Y$)
    !
    342     AURI = 1
            AURF = 0
    !
            ASM
    L349    RET
```

*****************************************************************
*
* HOST UART RECEIVER MAIN PROGRAM SEGMENT

```
* BASIC INPUTS:   HURF ..... HOST UART RECEIVER FLAG
*                              0 = CONSTRUCTING A STRING
*                              1 = STRING READY
*                              2 = ERROR
*                 HUR$ ..... HOST UART RECEIVE STRING
*                 COMF ..... COMMAND FLAG
*                              0 = COMMAND STRING TAKEN
*                              1 = NEW COMMAND READY
*                            COMF IS SET BY "HURMAIN" WHEN A NEW COM$ IS LOADED,
*                            AND IS RESET BY "COMINT" WHEN COM$ IS ACTED UPON.
* BASIC OUTPUTS:  HURF, COMF, HURI
*
HURMAIN    OR     A
           ENDASM
!
           IF HURF=0 THEN RETURN         ;! IF: STRING NOT READY   THEN: EXIT
!
           IF COMF=1 THEN RETURN         ;! IF: PREVIOUS COMMAND NOT YET TAKEN
!                                        ;! THEN: EXIT
!
           IF HURF=1 THEN COM$=HUR$: COMF=1
!                                        ;! IF: A STRING IS READY
!                                        ;! THEN: COPY FROM FROM UART STRING TO
!                                        ;!       THE COMMAND STRING AND SET THE
!                                        ;!       COMMAND FLAG

IF HURF=2 THEN ERRF=1: OUT(16R71)=16R37
           HURI = 1                      ;! IF: AN ERROR OCCURRED AT THE UART
           HURF = 0                      ;! THEN: RESET THE UART ERROR FLAGS,
!                                        ;!       REINITIALIZE THE STRING BYTE
!                                        ;!       INDEX, RESET THE RECEIVE FLAG,
!                                        ;!       AND SET THE "ER" RESPONSE FLAG
           ASM
L419       RET
*
************************************************************************
*
* STOPSET
*
* BASIC INPUTS:   STP ...... FLAG TO REGISTER THE STATE OF THE ROUTINE
*                              0 = NOT STOPPED
*                              1 = INITIATE
*                              2 = PULSING
*                              3 = STOPPING
*                              4 = STOPPED
*                 OS ....... ONESHOT TIMER
*                 OSF ...... ONESHOT FLAG       >0=BUSY      0=AVAILABLE
*                 P(1) ..... PIN NUMBER ASSOCIATED WITH THE STOP COMMAND
*                 TIMF ..... TIME BETWEEN FRAMES (1 UNIT = 833 MICRO-SEC)
* BASIC OUTPUTS:  STP, OSF, PINA, DIR, STF
*
STOPSET    OR     A
           ENDASM
!
           IF STP=0 THEN 203             ;! IF: NOT ACTIVE   THEN: GOTO 203
!
           IF STP>1 THEN 201             ;! IF: STOP FLAG IS OVER 2
           IF OSF<>0 THEN RETURN         ;! THEN: GOTO 201
```

```
              STP  = 2                  :! ELSEIF: ONESHOT IS NOT BUSY
              PINA = P(1)               :! THEN: ADVANCE STOP FLAG TO 2, LOAD
              OSF  = 1                  :!       THE PIN NUMBER, AND SET THE
              RETURN                    :!       ONESHOT FLAG
!                                       :! ELSE: EXIT
!
201           IF STP>2 THEN 202         :! IF: STOP FLAG IS OVER 2
              IF OS>0 THEN RETURN       :! THEN: GOTO 202
              STP = 3                   :! ELSEIF: ONESHOT HAS TIMED OUT
              RETURN                    :! THEN: ADVANCE STOP FLAG TO 3 AND EXIT
!                                       :! ELSE: EXIT
!
202           IF STP>3 THEN 203         :! IF: STOP FLAG IS OVER 3
              IF TIMF<255 THEN RETURN   :! THEN: GOTO 203
              STP = 4                   :! ELSEIF: TAPE SPEED IS LESS THAN 4.7
              DIR = 0                   :!         FRAMES/SEC
!                                       :!         (OR 47 FR/SEC IN FF OR RW)
              ASM                           THEN: ADVANCE THE STOP FLAG TO 4,
*
              CALL    RESINHIB              INHIBIT THE "ST" RESPONSE IF ANY OF THE
              LD      HL,VSLEW              HIGH LEVEL FUNCTIONS ARE ACTIVE OR
              ADD     A,(HL)                IF FASTFORW, PLAY, OR REWIND ARE
              LD      HL,VPLAY              ACTIVE.
              ADD     A,(HL)
              LD      HL,VRW
              ADD     A,(HL)
              RET     NZ
*
              LD      HL,VST$+1             RESET THE DIRECTION FLAG,
              LD      (HL),2                CONSTRUCT RESPONSE STRING
              INC     HL                    ST$ = "ST", AND RETURN.
              LD      (HL),'S'
              INC     HL
              LD      (HL),'T'
              RET
              ENDASM
!
!
203           IF TIMF>120 THEN RETURN   :! IF: SPEED GREATER THAN 10 FRAMES/SEC
              STP = 0                   :!     (OR 100 FRAMES/SEC IN FF OR RW)
!                                       :! THEN: RESET THE STOP FLAG
              ASM
L209          RET
```

***************************************************************************
*
* PLAYSET
*
* BASIC INPUTS:   PLAY ..... FLAG TO REGISTER THE STATE OF THE ROUTINE
*                            0 = NOT PLAYING
*                            1 = INITIATE
*                            2 = PULSING
*                            3 = ACCELERATING
*                            4 = PLAYING
*                 DIR ...... DIRECTION FLAG    1=FORW    0=STOPPED    -1=REV
*                 OS ....... ONESHOT TIMER
*                 OSF ...... ONESHOT FLAG      >0=BUSY        0=AVAILABLE
*                 P(3) ..... PIN NUMBER ASSOCIATED WITH THE PLAY COMMAND
*                 TIMF ..... TIME BETWEEN FRAMES (1 UNIT = 833 MICRO-SEC)
* BASIC OUTPUTS:  PLAY, DIR, OSF, PINA, PLF

```
PLAYSET    OR     A
           ENDASM
!
           IF PLAY=0 THEN RETURN         :! IF: INACTIVE         THEN: EXIT
!
           IF PLAY>1 THEN 211            :! IF: ALREADY INITIALIZED
           IF DIR=-1 THEN RETURN         :! THEN: GOTO 211
           IF OSF<>0 THEN RETURN         :! ELSE IF: DIRECTION IS NOT REVERSE
           PLAY = 2                      :!         AND THE ONESHOT IS NOT BUSY
           DIR  = 1                      :! THEN: ADVANCE PLAY FLAG TO 2, SET
           PINA = P(3)                   :!       DIR FLAG TO 1, LOAD PIN NUMBER,
           OSF  = 1                      :!       SET THE ONESHOT FLAG, RESET
           SLEW = 0                      :!       FAST FORW AND REWIND FLAGS, AND
           RW   = 0                      :!       RESET THE ERROR COUNTER FOR
           ECNT = 0                      :!       AUDIO UART READ ERRORS.
           RETURN                        :! ELSE: EXIT
!
211        IF PLAY>2 THEN 212            :! IF: PLAY FLAG IS OVER 2
           IF OS>0 THEN RETURN           :! THEN: GOTO 212
           PLAY = 3                      :! ELSE IF: THE ONSHOT HAS TIMED OUT
           RETURN                        :! THEN: ADVANCE THE PLAY FLAG TO 3 AND
                                         :!       AND EXIT
!                                        :! ELSE: EXIT
!
212        IF PLAY>3 THEN RETURN         :! IF: PLAY FLAG IS OVER 3
           IF TIMF>44 THEN RETURN        :! THEN: RETURN
           PLAY = 4                      :! ELSEIF: TAPE SPEED IS OVER 27 FRAMES
                                         :!         PER SECOND
           ASM                              THEN: ADVANCE THE PLAY FLAG TO 4,
*
           CALL   RESINHIB                  INHIBIT RESPONSE IF ANY HIGH
           RET    NZ                        LEVEL FUNCTION IS ACTIVE,
*
           LD     HL,VPL$+1                 CONSTRUCT THE RESPONSE STRING
           LD     (HL),2                    PL$ = "PL", AND RETURN.
           INC    HL
           LD     (HL),'P'
           INC    HL
           LD     (HL),'L'
L219       RET
*
*****************************************************************************
*
* FASTFORW
*
* BASIC INPUTS:  SLEW ....... FLAG TO REGISTER THE STATE OF THE ROUTINE
*                             0 = INACTIVE
*                             1 = INITIATE
*                             2 = PULSING
*                             3 = ACCELERATING
*                             4 = SLEWING FAST FORWARD
*                DIR ....... DIRECTION FLAG   1=FORW   0=STOPPED  -1=REVERSE
*                OS ....... ONE SHOT TIMER
*                OSF ...... ONE SHOT FLAG    >0=BUSY       0=AVAILABLE
*                P(5) ..... PIN NUMBER ASSOCIATED WITH THE FAST FORWARD COMMAND
*                TIMF ..... TIME BETWEEN FRAMES (1 UNIT = 833 MICRO-SEC)
* BASIC OUTPUTS: SLEW, DIR, OSF, PINA, RFFF
*
FASTFORW   OR     A
```

```
        ENDASM

IF SLEW=0 THEN RETURN          :! IF: NOT ACTIVE        THEN: EXIT

IF SLEW>1 THEN 221             :! IF: ALREADY INITIATED
        IF DIR=-1 THEN RETURN          :! THEN: GOTO 221
        IF OSF<>0 THEN RETURN          :! ELSE IF: DIR IS NOT REVERSE AND THE
        SLEW  = 2                      :!            ONESHOT IS AVAILABLE
        DIR   = 1                      :! THEN: ADVANCE THE SLEW FLAG TO 2, LOAD
        OSF   = 1                      :!       THE PIN NUMBER, SET THE DIR FLAG
        PINA  = P(5)                   :!       TO ONE, AND SET THE ONESHOT FLAG
        PLAY  = 0
        RW    = 0
        RETURN                         :! ELSE: EXIT

221     IF SLEW>2 THEN 222             :! IF: THE FAST FORW FLAG IS OVER 2
        IF OS>0 THEN RETURN            :! THEN: GOTO 222
        SLEW = 3                       :! ELSE IF: THE ONESHOT HAS TIMED OUT
        RETURN                         :! THEN: ADVANCE THE FAST FORW FLAG TO
                                       :!       3 AND EXIT
                                       :! ELSE: EXIT

222     IF SLEW>3 THEN RETURN          :! IF: THE FAST FORW FLAG IS OVER 3
        IF TIMF>200 THEN RETURN        :! THEN: EXIT
        SLEW = 4                       :! ELSE IF: TAPE SPEED EXCEEDS 60 FRAME
                                       :!           PER SECOND
        ASM                                    THEN: ADVANCE THE SLEW FLAG TO 4,

CALL    RESINHIB                       INHIBIT RESPONSE IF ANY HIGH
        RET     NZ                             LEVEL FUNCTION IS ACTIVE,

LD      HL,VFF$+1                      CONSTRUCT THE RESPONSE STRING
        LD      (HL),2                         FF$ = "FF", AND RETURN.
        INC     HL
        LD      (HL),'F'
        INC     HL
        LD      (HL),'F'
L229    RET

*****************************************************************
*
* REWIND
*
* BASIC INPUTS:   RW ....... FLAG TO REGISTER THE STATE OF THE ROUTINE
*                              0 = INACTIVE
*                              1 = INITIATE
*                              2 = PULSING
*                              3 = ACCELERATING
*                              4 = REWINDING
*                 DIR ...... DIRECTION FLAG  1=FORW   0=STOPPED   -1=REV
*                 OS ....... ONE SHOT TIMER
*                 OSF ...... ONE SHOT FLAG    >0=BUSY     0=AVAILABLE
*                 P(7) ..... PIN ASSOCIATED WITH THE REWIND COMMAND
*                 TIMF ..... TIME BETWEEN FRAMES (1UNIT = 833 MICRO-SEC)
* BASIC OUTPUTS:  RW, DIR, OSF, PINA, RWF

REWIND  OR      A
        ENDASM

IF RW=0 THEN RETURN            :! IF: INACTIVE          THEN: EXIT
```

```
          IF RW>1 THEN 231         !! IF: ALREADY INITIALIZED
          IF DIR=1 THEN RETURN     !! THEN: GOTO 231
          IF OSF<>0 THEN RETURN    !! ELSE IF: DIRECTION IS NOT FORWARD
          RW = 2                   !!          AND THE ONESHOT IS AVAILABLE
          DIR = -1                 !! THEN: ADVANCE REWIND FLAG TO 2, SET
          OSF = 1                  !!       THE DIRECTION FLAG FOR REVERSE,
          PINA = P(7)              !!       LOAD THE PIN NUMBER, SET THE
          SLEW = 0
          PLAY = 0
          RETURN                   !!       ONESHOT FLAG, AND EXIT
!                                  !! ELSE: EXIT
!
231       IF RW>2 THEN 232         !! IF: RW FLAG NOT OVER 2 AND THE ONESHOT
          IF OS>0 THEN RETURN      !!     HAS TIMED OUT
          RW = 3                   !! THEN: ADVANCE THE RW FLAG TO 3 AND
          RETURN                   !!       EXIT
!                                  !! ELSE: EXIT
!
232       IF RW>3 THEN 233         !! IF: THE RW FLAG NOT OVER 3 AND THE
          IF TIMF>200 THEN RETURN  !!     SPEED IS OVER 60 FRAMES/SEC
          RW = 4                   !! THEN: ADVANCE THE RW FLAG TO 4,
!
          ASM
*
          CALL    RESINHIB                 INHIBIT RESPONSE IF ANY HIGH
          RET     NZ                       LEVEL FUNCTION IS ACTIVE,
*
          LD      HL,VRW$+1                CONSTRUCT THE RESPONSE STRING
          LD      (HL),2                   RW$ = "RW", AND RETURN.
          INC     HL
          LD      (HL),'R'
          INC     HL
          LD      (HL),'W'
*                                          ELSE: RETURN
          ENDASM
233       IF TIMF<255 THEN RETURN  !! IF TAPE STOPS, RESET THE REWIND MODE
          RW = 0
          DIR = 0
          ASM
L239      RET
*
```

***************************************************************
*
* THIS LINE MARKS THE END OF THE CVA HALF OF THE CVA.003 PROGRAM.
*
*
*
* FILENAME: CVB IS BOTTOM HALF OF CVA.003 (SPLIT TO FIT IN EDITOR)
* 4 PM   12 JAN 1982                    DISKETTE: 217
***************************************************************
*
* PAUSE
*
* BASIC INPUTS:   PAUS ..... FLAG TO REGISTER THE STATE OF THE ROUTINE
*                        0 = NOT PAUSED
*                        1 = INITIATE
*                        2 = PULSING
*                        3 = STOPPING
*                        4 = PAUSED

```
*                    OS ...... ONE SHOT TIMER
*                    OSF ..... ONE SHOT FLAG           >0=BUSY   0=AVAILABLE
*                    P(9) .... PIN ASSOCIATED WITH PAUSE COMMAND
*                    TIMF .... TIME BETWEEN FRAMES (1 UNIT = 833 MICRO-SEC)
* BASIC OUTPUTS:  PAUS, OSF, PINA, PAF
*
PAUSE     OR        A
          ENDASM
!
          IF PAUS=0 THEN RETURN          :! IF: INACTIVE         THEN: EXIT
!
          IF PAUS>1 THEN 241             :! IF: ALREADY INITIALIZED
          IF OSF=1 THEN RETURN           :! THEN: GOTO 241
          PAUS = 2                       :! ELSE IF: ONESHOT IS AVAILABLE
          OSF = 1                        :! THEN: ADVANCE PAUSE FLAG TO 2, LOAD
          PINA = P(9)                    :!       THE PIN NUMBER, SET THE
          RETURN                         :!       ONESHOT FLAG, AND EXIT
!
241       IF PAUS>2 THEN 242             :! IF: PAUS IS NOT GREATER THAN 2 AND
          IF OS>0 THEN RETURN            :!     ONESHOT HAS TIMED OUT
          PAUS = 3                       :! THEN: ADVANCE PAUS TO 3 AND EXIT
          RETURN                         :! ELSE: EXIT
!
242       IF PAUS>3 THEN RETURN          :! IF: PAUS IS NOT GREATER THAN 3 AND
          IF TIMF<255 THEN RETURN        :!     THE SPEED IS LESS THAN 4.7
          PAUS = 4                       :!     FRAMES/SEC
!                                        :! THEN: ADVANCE THE PAUS FLAG TO 4,
          ASM                                     CONSTRUCT THE RESPONSE STRING
*
          CALL      RESINHIB                      INHIBIT RESPONSE IF ANY HIGH
          RET       NZ                            LEVEL FUNCTION IS ACTIVE,
*
          LD        HL,VPA$+1                     PA$ = "PA", AND RETURN.
          LD        (HL),2                ELSE: RETURN.
          INC       HL
          LD        (HL),'P'
          INC       HL
          LD        (HL),'A'
L249      RET
*
*****************************************************************************
*
* PAUSE RELEASE
*
* BASIC INPUTS:  PREL ..... FLAG TO REGISTER STATE OF ROUTINE
*                           0 = INACTIVE
*                           1 = INITIATE
*                           2 = PULSING
*                           3 = ACCELERATING
*                OS ....... ONE SHOT TIMER
*                OSF ..... ONE SHOT FLAG           >0=BUSY    0=AVAILABLE
*                P(11) ... PIN ASSOCIATED WITH PAUSE RELEASE
*                TIMF .... TIME BETWEEN FRAMES (1UNIT = 833 MICRO-SEC)
* BASIC OUTPUTS:  PREL, OSF, PINA, PRF
*
PAUSREL   OR        A
          ENDASM
!
          IF PREL=0 THEN RETURN          :! IF: INACTIVE         THEN: EXIT
!
```

```
              IF PREL>1 THEN 271           !! IF: ALREADY INITIALIZED
              IF OSF=1 THEN RETURN         !! THEN: GOTO 271
              PREL = 2                     !! ELSE IF: ONESHOT IS AVAILABLE
              OSF = 1                      !! THEN: ADVANCE PAUSE REL FLAG TO 2,
              PINA = P(9)                  !!       LOAD THE PIN NUMBER, SET THE
              RETURN                       !!       ONESHOT FLAG, AND EXIT
!                                          !! ELSE: EXIT
!
271           IF PREL>2 THEN 272           !! IF: PAUSE REL FLAG IS NOT GREATER THAN
              IF OS>0 THEN RETURN          !!     2 AND THE ONESHOT HAS TIMED OUT
              PREL = 3                     !! THEN: ADVANCE PAUSE REL FLAG TO 3
              RETURN                       !! ELSE: EXIT
!
272           IF TIMF>44 THEN RETURN       !! IF: SPEED EXCEEDS 27 FRAMES/SEC
              PREL = 0                     !! THEN: RESET THE PAUSE AND PAUSE
              PAUS = 0                     !!       RELEASE FLAGS, CONSTRUCT THE
!                                          !!       RESPONSE STRING PR$ = "PR",
              ASM                          !!       AND RETURN.
*
              CALL    RESINHIB                     INHIBIT RESPONSE IF ANY HIGH
              RET     NZ                           LEVEL FUNCTION IS ACTIVE,
*
              LD      HL,VPR$+1            ELSE: RETURN.
              LD      (HL),2
              INC     HL
              LD      (HL),'P'
              INC     HL
              LD      (HL),'R'
L279          RET
*
*****************************************************************************
*
* DUB SET SEGMENT
*
* BASIC INPUTS:   DUB ..... FLAG TO REGISTER THE STATE OF ROUTINE
*                           0 = NOT DUBBING
*                           1 = INITIATE
*                           2 = PULSING
*                           3 = DUB IS ACTIVE
*                 OS ...... ONE SHOT TIMER
*                 OSF ..... ONE SHOT FLAG    >0=BUSY    0=AVAILABLE
*                 P(12).... THE PIN ASSOCIATED WITH THE DUB FUNCTION
* ASS'Y INPUTS:   ICNT .... INTERRUPT COUNTER (INCREMENTS ON EVERY INTERRUPT)
* BASIC OUTPUTS:  DUB, OSF, DBF
*                 PINA .... OUTPUT PIN FOR ONESHOT
*
DUBSET        OR      A
              ENDASM
!
              IF DUB=0 THEN RETURN         !! IF: INACTIVE      THEN: EXIT
!
              IF DUB>1 THEN 253            !! IF: ALREADY INITIALIZED
              IF OSF<>0 THEN RETURN        !! THEN: JUMP TO 253
              IF PLAY=0 THEN 251
              PINB = P(3)
!
251           PINA = P(11)
              DUB = 2                      !! ELSE IF: ONESHOT IS AVAILABLE
              OSF = 1                      !! THEN: ADVANCE DUB TO 2, LOAD THE PIN
!                                          !!       NUMBER, SET THE ONESHOT FLAG,
```

```
252     X = 0                              !!      AND SET THE AUDIO UART FOR THE
        Y = 0                              !!      X1 CLOCK FUNCTION
        ASM
        LD      A,(ICNT)                   TEST THE ICNT BEFORE AND AFTER CODING
        LD      (VX),A                         THE UART TO DETECT FOR THE OCCURENCE
        LD      A,X'40'                        OF AN INTERRUPT.  IF AN INTERRUPT
        OUT     (X'61'),A                      DID OCCUR, THEN TRY AGAIN.
        LD      A,X'F9'
        OUT     (X'61'),A
        LD      A,X'01'
        OUT     (X'61'),A
        LD      A,(ICNT)
        LD      (VY),A
        ENDASM
        X = X - Y
        IF X<>0 THEN 252
        RETURN
!
253     IF DUB>2 THEN RETURN               !! IF: DUB FLAG IS NOT GREATER THAN 2
        IF OS>0 THEN RETURN                !!     AND THE ONE SHOT HAS TIMED OUT
        DUB = 3                            !! THEN: ADVANCE DUB FLAG TO 3, CONSTRUCT
!                                          !!       THE RESPONSE STRING DB$ = "DB",
        ASM                                         AND RETURN.
*
        CALL    RESINHIB                           INHIBIT RESPONSE IF ANY HIGH
        RET     NZ                                 LEVEL FUNCTION IS ACTIVE,
*
        LD      HL,VDB$+1                  ELSE: RETURN.
        LD      (HL),2
        INC     HL
        LD      (HL),'D'
        INC     HL
        LD      (HL),'B'
L259    RET
*
****************************************************************************
*
*  DUB RELEASE
*
*  BASIC INPUTS:   DUBR .....  FLAG TO REGISTER THE STATE OF ROUTINE
*                              0 = IDLE
*                              1 = INITIATE
*                              2 = PULSING
*                  OSF ......  ONE SHOT FLAG   >0=BUSY   0=AVAILABLE
*                  P(14) ...   THE PIN ASSOCIATED WITH DUB RELEASE
*  ASS'Y INPUTS:   ICNT .....  INTERRUPT COUNTER (INCREMENTS ON EVERY INTERRUPT)
*  BASIC OUTPUTS:  DUBR, OSF, DRF
*                  PINA .....  OUTPUT PIN FOR ONESHOT
*
DUBREL  OR      A
        ENDASM
!
        IF DUBR=0 THEN RETURN              !! IF: INACTIVE              THEN: EXIT
!
        IF DUBR>1 THEN 372                 !! IF: ALREADY INITIALIZED
        IF OSF<>0 THEN RETURN              !! THEN: JUMP TO 372
        DUBR = 2                           !! ELSE IF: THE ONESHOT IS AVAILABLE
```

```
              OSF  = 1                    ;! THEN: LOAD THE PIN NUMBER, SET THE
              PINA = P(1)                 ;!      ONE SHOT FLAG, AND SET THE AUDIO
371           X = 0                       ;!      UART FOR X16 CLOCK FUNCTION
              Y = 0
              ASM
              LD     A,(ICNT)             TEST ICNT BEFORE AND AFTER CODING
              LD     (VX),A                  THE UART TO DETECT FOR THE OCCURENCE
              LD     A,X'40'                 OF AN INTERRUPT. IF AN INTERRUPT DID
              OUT    (X'61'),A               OCCUR, THEN TRY AGAIN.
              LD     A,X'FA'
              OUT    (X'61'),A
              LD     A,X'04'
              OUT    (X'61'),A
              LD     A,(ICNT)
              LD     (VY),A
              ENDASM
              X = X - Y
              IF X<>0 THEN 371
              RETURN
!
372           IF OS>0 THEN RETURN         ;! IF: THE ONE SHOT HAS TIMED OUT
              DUBR = 0                    ;! THEN: RESET THE DUB RELEASE FLAG, THE
              DUB  = 0                    ;!      THE DUB FLAG, AND THE PLAY FLAG,
              PLAY = 0                    ;!      CONSTRUCT THE STRING DR$ = "DR",
!                                         ;!      AND RETURN
              ASM                              ELSE: RETURN.
*
              CALL   RESINHIB                     INHIBIT RESPONSE IF ANY HIGH
              RET    NZ                           LEVEL FUNCTION IS ACTIVE,
*
              LD     HL,VDR$+1
              LD     (HL),2
              INC    HL
              LD     (HL),'D'
              INC    HL
              LD     (HL),'R'
L379          RET
*
************************************************************************************
*
* PLAY TO TARGET AND PAUSE
*
* BASIC INPUTS:    PLPA ..... FLAG TO REGISTER THE STATE OF ROUTINE
*                             0 = IDLE
*                             1 = INITIATE
*                             2 = PLAYING
*                             3 = DECELERATING
*                             THE COMINT ROUTINE WILL SET THE FLAG TO ONE TO
*                             INITIATE THE PLAYPAUSE ROUTINE, AND UPON COMPLETION
*                             THE FLAG WILL AUTOMATICALLY RESET.
*                 TARF ..... TARGET FLAG
*                 OST6 ..... OFFSET FOR TARGET TEST
*                 TIMF ..... TIME BETWEEN FRAMES (1 UNIT = 833 MICRO-SEC)
* BASIC OUTPUTS: PLPA, PLAY, PAUS, PPF
*
PLAYPAUS EQU   *
         ENDASM
!
         IF PLPA=0 THEN RETURN         ;! IF: INACTIVE      THEN: EXIT
!
```

```
            IF PLPA>1 THEN 321           :! IF: ALREADY INITIALIZED
!                                        :! THEN: JUMP TO 321
!
            OSTA = OST6                  :! IF: THE CURRENT FRAME NUMBER IS
            ASM                                 GREATER THAN THE TARGET FRAME
            CALL TARGTEST                       OFFSET BY OST6
            ENDASM                       :! THEN: JUMP TO 322
            IF TARF=1 THEN 322
!
            PLPA = 2                     :! ADVANCE THE PLPA FLAG TO 2
!
            IF PAUS=0 THEN 325           :! IF: NOT PAUSED, THEN: PLAY
            PREL = 1                     :! IF: PAUSED,  THEN: RELEASE PAUSE
            RETURN
325         PLAY = 1
            RETURN
!
321         IF PLPA>2 THEN 323           :! IF: PLPA FLAG GREATER THAN 2
                                         :! THEN: JUMP TO 323
!
            OSTA = OST6                  :! IF: THE CURRENT FRAME NUMBER IS
            ASM                                 IS NOT GREATER THAN THE TARGET
            CALL TARGTEST                       FRAME NUMBER OFFSET BY OST6
            ENDASM                       :! THEN: RETURN
            IF TARF=0 THEN RETURN
!
322         PLPA = 3                     :! ADVANCE PLPA FLAG TO 3
            ATIM = 1000                  :! SET PASS COUNTER FOR 4 SECONDS
!
            IF PAUS<>0 THEN RETURN       :! IF: ALREADY PAUSED, THEN: RETURN
            PAUS = 1                     :! ELSE: INITIATE PAUSE AND RETURN
            RETURN
!
323         ATIM = ATIM - 1              :! IF: PASS COUNTER HAS TIMED OUT
            IF ATIM>0 THEN RETURN
            PLPA = 0                     :! THEN: RESET THE PLAYPAUS FLAG,
!                                        :!       CONSTRUCT THE RESPONSE STRING
            ASM                                  PP$ = "PP", AND RETURN.
            LD      HL,VPP$+1            ELSE: RETURN.
            LD      (HL),2
            INC     HL
            LD      (HL),'P'
            INC     HL
            LD      (HL),'P'
L329        RET
*
************************************************************************
*
* SKIP TO TARGET AND PLAY
*
* BASIC INPUTS:    SKPL ..... FLAG TO REGISTER THE STATE OF ROUTINE
*                             0 = IDLE
*                             1 = INITIATE FF OR RW
*                             2 = DOING FF OR RW
*                             3 = INITIATE PLAY AND WATCH FOR TARGET
*                             THE COMINT ROUTINE WILL SET THE FLAG TO ONE TO
*                             INITIATE THE SKIPPLAY ROUTINE, AND UPON COMPLETION
*                             THE FLAG WILL AUTOMATICALLY RESET
*                  TARF ..... TARGET FLAG
*                  DIR  ..... DIRECTION FLAG... 1=FORW, 0=STOPPED, -1=REVERSE
```

```
*                    OST2 ..... FAST FORWARD OFFSET FOR TARGTEST
*                    OST3 ..... REWIND OFFSET FOR TARGTEST
* BASIC OUTPUTS:  SKPL, OSTA, SLEW, RW, PLAY, SPF
*
SKIPPLAY   OR        A
           ENDASM
!
           IF SKPL=0 THEN RETURN           !! IF: INACTIVE  THEN: EXIT
           IF SKPL>1 THEN 303              !! IF: ALREADY INITIATED
!                                          !! THEN: JUMP TO TARGET TESTING
!
           OSTA = OST2                     !! IF: THE CURRENT FRAME IS LESS THAN
           ASM                                    THE TARGET FRAME OFFSET BY OST2
           CALL TARGTEST                      THEN: INITIATE FAST FORWARD
           ENDASM                          !! ELSE: JUMP TO THE REWIND TEST
           IF TARF=1 THEN 301
           SLEW = 1
           IF DIR=-1 THEN STP=1
           SKPL = 2
           RETURN
!
301        OSTA = OST3                     !! IF: THE CURRENT FRAME IS GREATER THAN
           ASM                             !!     THE TARGET FRAME OFFSET BY OST3
           CALL TARGTEST                   !! THEN: INITIATE REWIND
           ENDASM                          !! ELSE: INITIATE PLAY
           IF TARF=0 THEN 302
           RW = 1
           IF DIR=1 THEN STP=1
           SKPL = 2
           RETURN
302        PLAY = 1
           SKPL = 3
           RETURN
!
303        IF SKPL>2 THEN 305              !! IF:  TAPE IS REWINDING AND THE CURRENT
           IF RW>0 THEN 304                !!      FRAME NUMBER HAS EXCEEDED THE
           OSTA = OST2                     !!      TARGET FRAME OFFSET BY OST3
           ASM                                 THEN: INITIATE PLAY
           CALL TARGTEST
           ENDASM                          !! ELSE IF: THE TAPE IS GOING FAST FORW
           IF TARF=0 THEN RETURN           !!          AND THE CURRENT FRAME NUMBER
           PLAY = 1                        !!          HAS BECOME LESS THAN THE
           SKPL = 3                        !!          TARGET FRAME OFFSET BY OST2
           FF   = 0
           RETURN                          !! THEN: INITIATE STOP AND PLAY
304        OSTA = OST3                     !! ELSE IF: PLAYING ALREADY
           ASM                             !! THEN: JUMP DOWN TO WATCH FOR THE TARG.
           CALL TARGTEST
           ENDASM
           IF TARF=1 THEN RETURN
!
           ASM
           LD        A,1
           LD        (VSTP),A              STP = PLAY = 1
           LD        (VPLAY),A
*
           XOR       A                     RW = 0
           LD        (VRW),A
*
           ENDASM
```

```
              SKPL = 3
              RETURN
!
305           OSTA = 0                        :! IF: PLAYING AND THE CURRENT FRAME NO.
              ASM                                    HAS EXCEEDED THE TARGET FRAME
              CALL TARGTEST                          WITH NO OFFSET
              ENDASM                          :! THEN: RESET THE SKIPPLAY FLAG,
              IF TARF=0 THEN RETURN           :!       CONSTRUCT THE RESPONSE STRING
              SKPL = 0                        :!       SP$ = "SP", AND RETURN.
              ASM                                  ELSE: RETURN.
              LD    HL,VSP$+1
              LD    (HL),2
              INC   HL
              LD    (HL),'S'
              INC   HL
              LD    (HL),'P'
L309          RET
*
************************************************************************
*
* SKIP TO TARGET AND STOP
*
* BASIC INPUTS:   SKST ..... FLAG TO REGISTER THE STATE OF ROUTINE
*                            0 = IDLE
*                            1 = INITIATE FAST FORWARD OR REWIND
*                            2 = FAST FORWARD OR REWIND AND STOP
*                            THE COMINT ROUTINE WILL SET THE FLAG TO ONE TO
*                            INITIATE THE SKIPSTOP ROUTINE, AND UPON COMPLETION
*                            THE FLAG WILL AUTOMATICALLY RESET.
*                 TARF ..... TARGET FLAG (SEE TARGTEST ROUTINE)
*                 DIR  ..... DIRECTION FLAG ... 1=FORW, 0=STOPPED, -1=REVERSE
*                 OST4 ..... FAST FORWARD OFFSET FOR TARGTEST
*                 OST5 ..... REWIND OFFSET FOR TARGET TEST
* BASIC OUTPUTS:  SKST, OSTA, SLEW, RW, STP, SSF
*
SKIPSTOP OR   A
         ENDASM
!
         IF SKST=0 THEN RETURN
         IF SKST>1 THEN 312
!
!
         OSTA = OST4                          :! IF: THE CURRENT FRAME IS GREATER THAN
         ASM                                        THE TARGET FRAME OFFSET BY OST4
         CALL TARGTEST                              THEN: JUMP TO THE REWIND TEST
         ENDASM                               :! ELSE: INITIATE FAST FORWARD AND EXIT
         IF TARF=1 THEN 311
         SLEW = 1
         IF DIR=-1 THEN STP=1
         SKST = 2
         RETURN
!
311      OSTA = OST5                          :! IF: THE CURRENT FRAME IS LESS THAN
         ASM                                        THE TARGET FRAME OFFSET BY OST5
         CALL TARGTEST                        :! THEN: INITIATE STOP AND RESET SKST
         ENDASM                               :! ELSE: INITIATE REWIND AND EXIT
         IF TARF=0 THEN 314
         RW = 1
         IF DIR=1 THEN STP=1
         SKST = 2
```

```
            RETURN
!
312     IF SKST>2 THEN 315
        IF RW>0 THEN 313              !! IF: THE DIRECTION IS FORWARD AND
        OSTA = OST4                   !!    AND THE CURRENT FRAME IS STILL
        ASM                           !!    NOT GREATER THAN THE TARGET
        CALL TARGTEST                 !!    FRAME OFFSET BY OST4
        ENDASM                        !! THEN: EXIT
        IF TARF=0 THEN RETURN         !! ELSE IF: THE DIRECTION IS FORWARD
        GOTO 314                      !!    AND THE CURRENT FRAME IS BEYOND
                                      !! THEN: INITIATE STOP AND RESET SKST
!                                     !! ELSE: JUMP TO THE REVERSE TEST
!
313     OSTA = OST5                   !! IF: THE CURRENT FRAME IS GREATER THAN
        ASM                           !!    THE TARGET FRAME OFFSET BY OST5
        CALL TARGTEST                 !! THEN: EXIT
        ENDASM                        !! ELSE: INITIATE STOP AND RESET SKST
        IF TARF=1 THEN RETURN
!
314     STP  = 1                      !! INITIATE STOP, UPDATE MODE FLAGS, AND
        RW   = 0                      !!    INITIALIZE THE PASS-COUNTING TIMER
        SLEW = 0                      !!    FOR A DELAY OF ABOUT 4 SECONDS.
        SKST = 3
        ATIM = 1000
        RETURN
!
315     ATIM = ATIM - 1               !! WAIT FOR 4 SEC TIMER TO TIME OUT
        IF ATIM>0 THEN RETURN
        SKST = 0
!
        ASM
        LD      HL,VSS$+1             CONSTRUCT THE RESPONSE STRING
        LD      (HL),2                    SS$ = "SS" AND RETURN.
        INC     HL
        LD      (HL),'S'
        INC     HL
        LD      (HL),'S'
L319    RET
*
*********************************************************************
*
* ANNOTATE TO END FRAME NUMBER
*
* BASIC INPUTS:   ANNO ..... FLAG TO REGISTER STATE OF ROUTINE
*                            0 = IDLE
*                            1 = INITIATE
*                            2 = REWINDING
*                            3 = DUBBING
*                            4 = STOPPING
*                            THE COMINT ROUTINE WILL SET THE FLAG TO ONE TO
*                            INITIATE AUTOMATIC ANNOTATION, AND UPON COMPLETION,
*                            THE FLAG WILL ZERO ITSELF
*                 TIMF ..... TIME BETWEEN FRAMES (1 UNIT = 833 MICRO-SEC)
*                 TARF ..... TARGET FLAG (SEE TARGTEST ROUTINE)
* BASIC OUTPUTS:  ANNO, STP , RW, DUB, PLAY, OSTA
*                 AEF ..... ANNOTATE TO END FRAME NO. RESPONSE FLAG
*                 NFRH, NFRL ..... RESETS FRAME NUMBER AFTER REWINDING
*
ANNOTATE  OR    A
          ENDASM
```

```
          IF ANNO=0 THEN RETURN
          IF ANNO>1 THEN 331
!
          ANNO = 2                    !! SET THE STOP FLAG, SET THE REWIND
          STP  = 1                    !!    FLAG, INITIALIZE THE PASS
          RW   = 1                    !!    COUNTER FOR 2000 PASSES, AND EXIT.
          ATIM = 2000                 !! (THE STOP ROUTINE WILL ENGAGE THE
          RETURN                      !!    ONE SHOT BEFORE THE REWIND WILL)
!
331       IF ANNO>2 THEN 332
!
          ATIM = ATIM - 1             !! DECREMENT PASS COUNTER
!
          IF ATIM>0 THEN RETURN       !! DO NOTHING FOR 2000 PASSES, THEN TEST
          ATIM = ATIM + 1             !!    ON EACH SUCCESSIVE PASS FOR
          IF TIMF<255 THEN RETURN     !!    TAPE STOPPED AT FULL REWIND.
!
          DIR  = 0                    !! AFTER STOP AT FULL REWIND, UPDATE
          NFRL = 0                    !!    THE MODE FLAGS AND CLEAR THE
          NFRH = 0                    !!    FRAME COUNT.
          RW   = 0
          DUB  = 1
          PLAY = 1
          ANNO = 3
!
332       IF ANNO>3 THEN 333
!
          OSTA = 0                    !! SET TARGET OFFSET TO ZERO, AND EXIT
          ASM                                IF NOT YET AT TARGET FRAME.
          CALL TARGTEST
          ENDASM
          IF TARF=0 THEN RETURN
!
          ANNO = 4                    !! AT TARGET FRAME, SET THE DUBRELEASE
          DUBR = 1                    !!    FLAG, SET THE STOP FLAG, RESET
          STP  = 1                    !!    THE PLAY FLAG, ADVANCE THE
          PLAY = 0                    !!    ANNOTATE FLAG TO 4, AND RETURN.
          ATIM = 2000
          RETURN
!
333       ATIM = ATIM - 1             !! WHEN THE 8 SECOND TIMER TIMES OUT,
          IF ATIM>0 THEN RETURN       !!    RESET THE ANNO FLAG, AND CONSTRUCT
          ANNO = 0                    !!    THE RESPONSE STRING AE$ = "AE".
          ASM
          LD       HL,VAE$+1
          LD       (HL),2
          INC      HL
          LD       (HL),'A'
          INC      HL
          LD       (HL),'E'
L339      RET
*
***************************************************************************
*
* OUTPUT PULSE ..... ASSOCIATED WITH THE "OP" COMMAND
*
* BASIC INPUTS:   OUPU ..... FLAG TO REGISTER STATE OF ROUTINE
*                            0 = IDLE STATE
*                            1 = INITIATE A PULSE WHEN ONE SHOT IS AVAILABLE
```

```
*                              2 = PULSE ACTIVE
*                              OUPU IS SET TO ONE BY THE COMINT ROUTINE AND RESETS
*                              ITSELF UPON PULSE COMPLETION.
*                OUPI ..... THE PIN NUMBER OF THE OUTPUT TO BE PULSED
*                OSF ...... THE ONESHOT FLAG (SEE THE ONESHOT ROUTINE)
*                OS ....... THE ONE SHOT TIMER (SEE THE ONESHOT ROUTINE)
* BASIC OUTPUTS: OUPU ..... SEE ABOVE
*                OPF ...... "OP" RESPONSE FLAG
*
OUTPULSE  OR      A
          ENDASM
          IF OUPU=0 THEN RETURN        :! IF OUPU=0 THEN EXIT
          IF OUPU>1 THEN 381           :! JUMP IF ALREAD INITIALIZED
          IF OSF=1  THEN RETURN        :! IF ONE SHOT IS BUSY, EXIT
!
          OUPU = 2                     :! INITIALIZE WHEN ONE SHOT AVAILABLE
          OSF  = 1
          PINA = OUPI
          RETURN
!
381       IF OS>0 THEN RETURN          :! WAIT FOR ONE SHOT TIMEOUT, THEN RESET
          OUPU = 0                     :!      THE OUTPUT PULSE FLAG, CONSTRUCT
          ASM                                  THE RESPONSE STRING OP$ = "OP",
          LD      HL,VOP$+1                    AND RETURN.
          LD      (HL),2
          INC     HL
          LD      (HL),'O'
          INC     HL
          LD      (HL),'P'
L389      RET
*
*****************************************************************************
*
* ONESHOT FOR GENERATING 0.2 SEC PULSES
*
* BASIC INPUTS:  OSF ..... FLAG TO REGISTER STATE OF ONESHOT TIMER
*                          0 = IDLE STATE
*                          1 = INITIATE
*                          2 = TIMER ACTIVE
*                          OUTSIDE OF THIS ROUTINE, OSF SHOULD BE TESTED FOR
*                          ZERO AND THEN SET TO ONE TO INITIATE A NEW PULSE
*                          ONLY IF IT IS ZERO
*                PINA .... PRIMARY OUTPUT PIN TO BE PULSED
*                PINB .... A SECOND OUTPUT PIN TO BE PULSED SIMULTANEOUSLY.
*                          PINB IS SET TO A NON-EXISTENT PIN AT TIMEOUT SO
*                          THAT ONLY PINA NEED BE SPECIFIED WHEN ONLY ONE PIN
*                          IS TO BE PULSED.
* BASIC OUTPUTS: OSF ..... SEE ABOVE
* I/O OUTPUTS:   PIN NUMBER "PINA" IS PULSED LOW FOR 0.2 SECONDS, AND
*                PIN NUMBER "PINB" IS SIMULTANEOUSLY PULSED LOW.
*
ONESHOT   OR      A
          ENDASM
          IF OSF=0 THEN RETURN         :! SKIP THE ROUTINE IF OSF=0
          IF OSF>1 THEN 261
!
          OSF = 2
          OS  = 240                    :! PRESET TIMER FOR 0.2 SEC
!
          BITF = 1                     :! SET BIT FLAG FOR A LOW ON OUTPUT PIN
```

```
              PIN  = PINA              ;! AND CALL PAROUT TWICE, ONCE FOR
              ASM                      ;! FOR PINA AND ONCE FOR PINB.
              CALL   PAROUT
              ENDASM
              PIN  = PINB
              ASM
              CALL   PAROUT
*
              LD     A,(ICNT)          SAVE VALUE OF INTERRUPT COUNTER
              LD     (ICNT1),A             AND RETURN.
              RET
*
L261          LD     HL,0              OSDE = ICNT2 - ICNT1
              LD     (VOSDE),HL
              LD     A,(ICNT)
              LD     (ICNT2),A
              LD     HL,ICNT1
              SUB    (HL)
              LD     (VOSDE),A
*
              LD     A,(ICNT2)          ICNT1 = ICNT2
              LD     (ICNT1),A
*
              ENDASM                   ;! UPDATE VALUE OF ONE SHOT AND LIMIT
              OS = OS - OSDE           ;!   THE LOW VALUE TO ZERO
              IF OS<0 THEN OS=0
!
              IF OS>0 THEN RETURN      ;! RETURN IF ONESHOT HAS NOT TIMED OUT.
!
              OSF  = 0                 ;! RESET THE ONESHOT FLAG, RESET THE
              BITF = 0                 ;!   BIT FLAG, CALL PAROUT TO SET
              PIN  = PINA              ;!   PINA BACK HIGH AND AGAIN TO SET
              ASM                      ;!   PINB BACK HIGH.
              CALL   PAROUT
              ENDASM
              PIN  = PINB
              ASM
              CALL   PAROUT
              ENDASM
!
              PINB = 0                 ;! INITIALIZE PINB TO A NON-EXISTENT PIN.
!
              ASM
L269          RET
*
;***************************************************************************
*
* INPUT/OUTPUT TO THE 16 PIN PARALLEL PORT
*
* BASIC INPUTS:   O(1), O(2), O(3), O(4), O(5), O(6), O(7)
* BASIC OUTPUTS:  I(0), I(2), I(3), I(4), I(5), I(6), I(7)
*
INOUT         OR     A
              ENDASM
!
              OUT(1)  = O(1)
              OUT(2)  = O(2)
              OUT(3)  = O(3)
              OUT(16) = O(4)
              OUT(17) = O(5)
```

```
            OUT(18) = O(6)
            OUT(19) = O(7)

I(0) = IN(4)
            I(2) = IN(6)
            I(3) = IN(7)
            I(4) = IN(16)
            I(5) = IN(17)
            I(6) = IN(18)
            I(7) = IN(19)

ASM
            RET
*
************************************************************************
*
* RESPONSES TO THE HOST COMPUTER
*
* BASIC INPUTS:   HUXF .....  HOST XMIT FLAG = 1 WHEN XMITTER IS BUSY
*                 RESPONSE STRINGS:
*                 AE$, DB$, DR$, FF$, FR$, IS$, OP$, PA$, PE$, PL$, PP$, PR$,
*                 RI$, RF$, RW$, SP$, SR$, SS$, ST$
* BASIC OUTPUTS:  HUX$ .....  RESPONSE STRING TO BE SENT TO THE HOST UART
*                 HUXF .....  HUXF WILL BE SET HERE, BUT RESET BY HXMT ROUTINE
* OVERVIEW OF ROUTINE:
*         IF THE TRANSMITTER IS BUSY,  THEN RETURN IMMEDIATELY.
*         ONE-BY-ONE EXAMINE THE LENGTH BYTE OF THE RESPONSE STRINGS UNTIL
*             ONE IS FOUND WITH A NON-ZERO LENGTH.  COPY THE STRING TO THE
*             TRANSMITTER STRING "HUX$" ALONG WITH A "CR" AND A "LF", RESET
*             THE STRING LENGTH TO PREVENT REPEATS OF THE SAME MESSAGE, SET
*             THE TRANSMITTER MESSAGE FLAG "HUXF", AND RETURN WITHOUT
*             EXAMINING ANY MORE STRINGS.
*         IF SEVERAL STRING LENGTHS ARE NON-ZERO, THEN THE FIRST ONE ENCOUNTERED
*             WILL BE COPIED AS ABOVE AND THE OTHERS WILL BE LEFT TO BE COPIED
*             ON A SUCCEEDING PASS.
*         IF NO STRINGS HAVE NON-ZERO LENGTH, THEN THE ROUTINE RETURNS WITHOUT
*             SETTING THE TRANSMITTER FLAG "HUXF".
*
*
RESPONSE OR      A
*
            ENDASM
            IF HUXF=1 THEN RETURN
            ASM
*
            LD      A,(VERRF)               SET THE STRING LENGTH TO 2 WHEN THE
            AND     A,A                     ERROR FLAG IS SET (ERRF=1) AND
            LD      HL,VER$+1               CONSTRUCT THE ERROR STRING.
            LD      (HL),A
            INC     HL
            LD      (HL),'E'
            INC     HL
            LD      (HL),'R'
            LD      HL,VERRF
            LD      (HL),0
*
            LD      A,0                     INITIALIZE LENGTH(HUX$) = 0
            LD      (VHUX$+1),A
*
            CALL    RESP1                   ROUTINE RESP1 EXAMINES EACH RESPONSE
```

```
          LD    A,(VHUX$+1)         STRING, SEE BELOW.   IF LENGTH(HUX$)
          RET   Z                   IS STILL ZERO, THEN RETURN TO THE
*                                   MAIN LOOP.
*
          LD    DE,VHUX$            TACK ON A "CR" AND A "LF" AT THE END
          LD    A,(VHUX$+1)         OF THE HUX$ STRING.
          INC   A
          INC   A
          LD    (VHUX$+1),A
          LD    H,0
          LD    L,A
          ADD   HL,DE
          LD    (HL),X'0D'
          INC   HL
          LD    (HL),X'0A'
*
        ENDASM
        HUXF = 1
        ASM
          RET                       THIS IS THE EXIT POINT BACK TO THE MAIN
*                                   LOOP WHEN A MESSAGE IS COPIED
*                                   TO THE TRANSMITTER STRING.
*
RESP1     LD    HL,VAE$             SUBROUTINE FOR TESTING EACH RESPONSE
          CALL  RESP2               STRING FOR A NON-ZERO LENGTH.
          RET   NZ
*
          LD    HL,VDP$
          CALL  RESP2
          RET   NZ
*
          LD    HL,VDR$
          CALL  RESP2
          RET   NZ
*
          LD    HL,VFF$
          CALL  RESP2
          RET   NZ
*
          LD    HL,VEH$
          CALL  RESP2
          RET   NZ
*
          LD    HL,VIS$
          CALL  RESP2
          RET   NZ
*
          LD    HL,VOP$
          CALL  RESP2
          RET   NZ
*
          LD    HL,VPA$
          CALL  RESP2
          RET   NZ
*
          LD    HL,VPE$
          CALL  RESP2
          RET   NZ
*
          LD    HL,VPL$
```

```
        CALL    RESP2
        RET     NZ
*
        LD      HL,VPP$
        CALL    RESP2
        RET     NZ
*
        LD      HL,VPR$
        CALL    RESP2
        RET     NZ
*
        LD      HL,VRI$
        CALL    RESP2
        RET     NZ
*
        LD      HL,VRF$
        CALL    RESP2
        RET     NZ
*
        LD      HL,VRW$
        CALL    RESP2
        RET     NZ
*
        LD      HL,VSP$
        CALL    RESP2
        RET     NZ
*
        LD      HL,VSR$
        CALL    RESP2
        RET     NZ
*
        LD      HL,VSS$
        CALL    RESP2
        RET     NZ
*
        LD      HL,VST$
        CALL    RESP2
        RET     NZ
*
        RET
*
RESP2   INC     HL                      IF STRING LENGTH IS ZERO, THEN RETURN.
        LD      A,(HL)
        OR      A
        RET     Z
*
        LD      BC,0                    LOAD BC WITH THE LENGTH OF THE STRING,
        LD      C,A                       AND CLEAR THE LENGTH BYTE.
        LD      (HL),B
*
        LD      DE,VHUX$+1              LOAD (HUX$+1) WITH THE STRING LENGTH, AND
        LD      (DE),A                    COPY THE RESPONSE MESSAGE TO THE
        INC     DE                        HUX$ STRING, THEN RETURN.
        INC     HL
        LDIR
        RET
*
************************************************************************
*
* BITMASK
```

```
*       BASIC INPUTS: PIN = PIN TO BE MASKED WITH A 1 IN VARIABLE Y
*       BASIC OUTPUTS: Y = MASK.....JUST ONE BIT WILL BE HIGH
*                      X = NOT Y....JUST ONE BIT WILL BE LOW
*                      PORT = I/O PORT WHERE PIN IS LOCATED
*
BITMASK EQU     *
        ENDASM
!
        Y = 0
        X = NOT Y
        PORT = 99
!
        ASM
        LD      A,(VPIN)        IF: 0 < PIN < 49   THEN: CONTINUE
        OR      A               ELSE: RETURN
        RET     Z
        CP      49
        RET     P
*
        LD      HL,BITMASKY     (VY) = (BITMASKY + (PIN))
        LD      A,(VPIN)           I.E. LOAD Y FROM TABLE "BITMASKY"
        LD      D,0                     USING "PIN" AS AN OFFSET INDEX.
        LD      E,A
        ADD     HL,DE
        LD      A,(HL)
        LD      (VY),A
*
        LD      HL,BITPORT      (VPORT) = (BITPORT + (PIN))
        ADD     HL,DE              I.E. LOAD "PORT" FROM TABLE "BITPORT"
        LD      A,(HL)                  USING "PIN" AS AN OFFSET INDEX.
        LD      (VPORT),A
*
        ENDASM
        X = NOT Y
        ASM
*
L99     RET
*
*****************************************************************
*
* PARALLEL INPUT
*
*       BASIC INPUT:  PIN    THE INPUT PIN TO BE READ
*       BASIC OUTPUT: BITF   THE STATE OF INPUT PIN, 0=HIGH, 1=LOW
*
PARIN   OR      A
        CALL    BITMASK
        ENDASM
!
        IF PORT=99 THEN RETURN
!
        IF PORT<4 THEN I=PORT
        IF PORT>3 THEN I=PORT-12
!
        BITF = I(I) AND Y
!
        ASM
        RET
*
```

```
************************************************************
*
* PARALLEL OUTPUT
*
PAROUT    EQU     *
          CALL    BITMASK
          ENDASM
          IF PORT=99 THEN RETURN
!
          IF PORT<4 THEN I=PORT
          IF PORT>3 THEN I=PORT-12
!
          IF BITF=1 THEN O(I)=O(I) OR Y
          IF BITF=0 THEN O(I)=O(I) AND X
!
          ASM
L399      RET
*
************************************************************
*
* RESPONSE INHIBIT TEST
*
*         INPUTS:  ANNO, PLPA, SKPL, SKST
*         OUTPUTS: IF ANY OF THE INPUT FLAGS IS HIGH, THE A-REGISTER WILL
*                  BE RETURNED NON-ZERO AND THE ZERO FLAG WILL BE RESET.
*
RESINHIB  EQU     *
          LD      A,0
          LD      HL,VANNO
          ADD     A,(HL)
          LD      HL,VPLPA
          ADD     A,(HL)
          LD      HL,VSKPL
          ADD     A,(HL)
          LD      HL,VSKST
          ADD     A,(HL)
          RET
*
************************************************************
*
* TEST FOR TARGET FRAME
*
*         INPUTS:  NFRL, NFRH     CURRENT FRAME NUMBER
*                  TFNL, TFNH     TARGET FRAME NUMBER
*                  OSTA           OFFSET ADDED TO TARGET FRAME NUMBER
*
*         OUTPUT:  TARF           TARGET FLAG = 1 WHEN BEYOND TFN + OSTA
*
TARGTEST  OR      A                    DUMMY
          ENDASM
280       X = NFRH - TFNH
          Y = NFRL - TFNL - OSTA
          IF X>2 THEN 281
          IF X<-2 THEN 282
          Y = Y + X * 1000
          IF Y>0 THEN 281
282       TARF = 0
          RETURN
281       TARF = 1
          ASM
```

```
L289        RET
*
************************************************************************
*
*  FRAME NUMBER STRING FUNCTION
*
*  BASIC INPUTS:   NFRH, NFRL
*  BASIC OUTPUTS:  X$
*  INTERNAL VARIABLES : X, Y, Y$
*
*  OVERVIEW: X$ IS A 6 CHARACTER STRING REPRESENTING THE FRAME NUMBER
*            PER NFRH AND NFRL.
*
NFSTRING    OR      A
            ENDASM
!
            X = NFRH + 1000             !! ADD 1000 AND IGNORE THE 4TH DIGIT
            X$ = STR(X)                 !!  TO FAKE THE STRING ROUTINE INTO
            X$ = MID(X$,3,3)            !!  RETURNING A STRING IN A 3 DIGIT
!                                       !!  FIXED FORMAT.
            Y = NFRL + 1000
            Y$ = STR(Y)
            Y$ = MID(Y$,3,3)            !! STRING FORMAT:
!                                       !!  BYTE  1    2    3    4    5    6
            X$ = X$ + Y$                !!        SIGN  1    X    X    X    SP
!
            ASM
            RET
*
************************************************************************
*
*  INTERRUPT ROUTINES
*
INT38       EX      AF,AF'
            EXX
            PUSH    IX
            PUSH    IY
*
************************************************************************
*
*  CONTROL PULSE SERVICE
*
CPULSE      LD      A,(ICNT)            ICNT = ICNT + 1
            INC     A
            LD      (ICNT),A
*
            LD      A,(VSLEW)           IF SLEWING FAST FORWARD OR REWINDING
            LD      HL,VRW                 THEN INPUT FROM THE INPUT BIT
            AND     A,(HL)                 THAT IS THE CONTROL PULSE SIGNAL
            JP      NZ,CPULSE4             DIVIDED BY TEN (BIT 3).
            IN      A,(4)               OTHERWISE, INPUT THE BIT THAT IS NOT
            AND     1                      DIVIDED BY TEN (BIT 0).
            JP      CPULSE5
CPULSE4     IN      A,(4)
            AND     8
*
CPULSE5     LD      HL,CPULS            IF:   A CONTROL PULSE OCCURRED
            CP      (HL)                THEN: UPDATE CPULS,
            JP      Z,CPULSE2                 TIMF = TICF,
            LD      (CPULS),A                 TICF = 0
```

```
            LD      A,(TICF)              ELSE: JUMP TO CPULSE2
            LD      (VTIMF),A
            LD      A,0
            LD      (TICF),A
*
            LD      A,(FRAME)             IF:   FRAME = 0  AND CPULS = 0
            OR      A                     THEN: JUMP TO CPULSE2
            JP      NZ,CPULSE1            ELSE: FCOUNT = FCOUNT + 1
            LD      A,(CPULS)
            OR      A
            JP      Z,CPULSE2
CPULSE1     LD      A,(FCOUNT)
            INC     A
            LD      (FCOUNT),A
*
            LD      A,(VAUF)              IF:   AUF = 1 AND FCOUNT > 9
            OR      A                     THEN: FCOUNT = 0 ,
            JP      Z,CPULSE2                   AUXF   = 1
            LD      A,(FCOUNT)
            CP      10
            JP      M,CPULSE2
            LD      A,0
            LD      (FCOUNT),A
            INC     A
            LD      (VAUXF),A
*
CPULSE2     LD      A,(TICF)              IF:   TICF <> 255
            INC     A                     THEN: TICF = TICF + 1
            JP      NZ,CPULSE3            ELSE: TIMF = TICF = 255
            LD      A,255
            LD      (VTIMF),A
CPULSE3     LD      (TICF),A
*
***************************************************************
*
* HOST UART TRANSMITTER SERVICE
*
HXMT        IN      A,(X'71')             HUSTATUS = IN(71)
            LD      (HUSTATUS),A
*
            AND     1                     IF:   HUXF = 0 OR XMIT NOT READY
            JP      Z,(HXMT3)             THEN: EXIT
            LD      A,(VHUXF)
            OR      A
            JP      Z,(HXMT3)
*
            LD      HL,(VHUXI)            XMIT DATA = (VHUX$ + (VHUXI))
            LD      DE,VHUX$
            AND     HL,DE
            LD      A,(HL)
            OR      X'80'                         SET MSB = 1
            OUT     (X'70'),A
*
            CP      X'8A'                 IF:   DATA BYTE = "LF"
            JP      Z,HXMT2               THEN: HUXF=0, HUXI=2, EXIT
*
HXMT1       LD      A,(VHUXI)             HUXI = HUXI + 1
            INC     A
            LD      (VHUXI),A
*
```

```
            CP      32                      IF:  HUXI < 32
            JP      M,HXMT3                 THEN: EXIT
HXMT2       LD      A,0                     ELSE: HUXF=0, HUXI=2, EXIT
            LD      (VHUXF),A
            INC     A
            INC     A
            LD      (VHUXI),A
*
HXMT3       EQU     *                       EXIT POINT
*
************************************************************************
*
* HOST UART RECEIVER SERVICE
*
HRCVR       LD      A,(HUSTATUS)            IF:  RECEIVER NOT READY
            AND     2                       THEN: EXIT
            JP      Z,HRCVR5
*
            LD      A,(VHURF)               IF:  HURF <> 0
            OR      A                       THEN: DO A DUMMY RECEIVER READ AND EXIT
            JP      Z,HRCVR1
            IN      A,(X'70')
            JP      HRCVR5
*
HRCVR1      LD      A,(HUSTATUS)            IF:  ANY RCVR ERROR FLAGS UP, OR
            AND     X'38'                        HURI > 30
            JP      NZ,HRCVR2               THEN: HURF=2 AND EXIT
            LD      A,(VHURI)
            CP      31
            JP      M,HRCVR3
HRCVR2      LD      A,2
            LD      (VHURF),A
            JP      HRCVR5
*
HRCVR3      IN      A,(X'70')               READ THE DATA BYTE AND SET MSB = 0.
            AND     X'7F'
            CP      X'0D'                   IF:  DATA BYTE = "CR"
            JP      NZ,HRCVR4               THEN: SET LENGTH OF AUR$ = AURI, AND
            LD      A,(VHURI)                     SET AURF = 1 TO INDICATE THAT A
            LD      (VHUR$+1),A                   COMMAND STRING IS READY.
            LD      A,1
            LD      (VHURF),A
*
HRCVR4      LD      A,(VHURI)               HURI = HURI + 1
            INC     A
            LD      (VHURI),A
*
            LD      HL,(VHURI)              (VHUR$+(VHURI)) = IN(70)
            LD      DE,VHUR$
            ADD     HL,DE
            IN      A,(X'70')               READ DATA BYTE AND SET MSB = 0
            AND     X'7F'
            LD      (HL),A
*
HRCVR5      EQU     *                       EXIT POINT
*
************************************************************************
*
* AUDIO UART TRANSMITTER SERVICE
```

```
AXMT      IN    A,(X'61')              AUSTATUS = IN(61)
          LD    (AUSTATUS),A
*
          AND   1                      IF:   XMITTER NOT READY, OR AUXF=0
          JP    Z,AXMT3                THEN: EXIT
          LD    A,(VAUXF)
          OR    A
          JP    Z,AXMT3
*
          LD    HL,(VAUXI)             XMIT DATA = (VAUX$ + (VAUXI))
          LD    DE,VAUX$
          ADD   HL,DE
          LD    A,(HL)
          OUT   (X'60'),A
*
          CP    X'0D'                  IF:   DATA BYTE = "CR"
          JP    Z,AXMT2                THEN: AUXF=0; AUXI=2; EXIT
*
AXMT1     LD    A,(VAUXI)              AUXI = AUXI + 1
          INC   A
          LD    (VAUXI),A
*
          CP    18                     IF:   AUXI < 18
          JP    M,AXMT3                THEN: EXIT
AXMT2     LD    A,0                    ELSE: AUXF=0; AUXI=2; EXIT
          LD    (VAUXF),A
          INC   A
          INC   A
          LD    (VAUXI),A
*
AXMT3     EQU   *                      EXIT POINT
*
************************************************************
*
* AUDIO UART RECEIVER SERVICE
*
ARCVR     LD    A,(AUSTATUS)           IF:   RECEIVER NOT READY
          AND   2                      THEN: EXIT
          JP    Z,ARCVR4
*
          LD    A,(AUSTATUS)           IF:   ANY RCVR ERROR FLAGS UP, OR
          AND   X'38'                        AURI > 16
          JP    NZ,ARCVR1              THEN: AURF=2 AND EXIT
          LD    A,(VAURI)
          CP    17
          JP    M,ARCVR2
ARCVR1    LD    A,2
          LD    (VAURF),A
          JP    ARCVR4
*
ARCVR2    IN    A,(X'60')              IF:   DATA BYTE = "CR"
          CP    X'0D'                  THEN: LENGTH OF AUR$ = AURI, AND
          JP    NZ,ARCVR3                    AURF=1
          LD    A,(VAURI)
          LD    (VAUR$+1),A
          LD    A,1
          LD    (VAURF),A
*
ARCVR3    LD    A,(VAURI)              AURI = AURI + 1
          INC   A
```

```
            LD      (VAURI),A
*
            LD      HL,(VAURI)              (VAURI + (VAURI)) = IN(60)
            LD      DE,VAURS
            ADD     HL,DE
            IN      A,(X'60')
            LD      (HL),A
*
ARCVR4      EQU     *                       EXIT POINT
*
************************************************************************
*
* RETURN FROM INTERRUPT
*
INT38R      OUT     (0),A                   RESET IRQ, RESTORE REGISTERS,
            EX      AF,AF'                  ENABLE INTERRUPTS, AND RETURN
            EXX
            POP     IX
            POP     IY
            EI
            RETI
*
************************************************************************
*
* TABLES FOR USE BY THE BITMASK ROUTINE
*
BITMASKY    DC      0                       PIN
            DC      X'80'                   1
            DC      X'80'                   2
            DC      X'40'                   3
            DC      X'40'                   4
            DC      X'20'                   5
            DC      X'20'                   6
            DC      X'10'                   7
            DC      X'10'                   8
*
            DC      X'08'                   9
            DC      X'08'                   10
            DC      X'04'                   11
            DC      X'04'                   12
            DC      X'02'                   13
            DC      X'02'                   14
            DC      X'01'                   15
            DC      X'01'                   16
*
            DC      X'80'                   17
            DC      X'80'                   18
            DC      X'40'                   19
            DC      X'40'                   20
            DC      X'20'                   21
            DC      X'20'                   22
            DC      X'10'                   23
            DC      X'10'                   24
*
            DC      X'08'                   25
            DC      X'08'                   26
            DC      X'04'                   27
            DC      X'04'                   28
            DC      X'02'                   29
            DC      X'02'                   30
```

```
         DC     X'01'           31
         DC     X'01'           32
*
         DC     X'80'           33
         DC     X'80'           34
         DC     X'40'           35
         DC     X'40'           36
         DC     X'20'           37
         DC     X'20'           38
         DC     X'10'           39
         DC     X'10'           40
*
         DC     X'08'           41
         DC     X'08'           42
         DC     X'04'           43
         DC     X'04'           44
         DC     X'02'           45
         DC     X'02'           46
         DC     X'01'           47
         DC     X'01'           48
*
BITPORT  DC     99              PIN
         DC     X'03'           1
         DC     X'02'           2
         DC     X'03'           3
         DC     X'02'           4
         DC     X'03'           5
         DC     X'02'           6
         DC     X'03'           7
         DC     X'02'           8
*
         DC     X'03'           9
         DC     X'02'           10
         DC     X'03'           11
         DC     X'02'           12
         DC     X'03'           13
         DC     X'02'           14
         DC     X'03'           15
         DC     X'02'           16
*
         DC     X'11'           17
         DC     X'10'           18
         DC     X'11'           19
         DC     X'10'           20
         DC     X'11'           21
         DC     X'10'           22
         DC     X'11'           23
         DC     X'10'           24
*
         DC     X'11'           25
         DC     X'10'           26
         DC     X'11'           27
         DC     X'10'           28
         DC     X'11'           29
         DC     X'10'           30
         DC     X'11'           31
         DC     X'10'           32
*
         DC     X'13'           33
         DC     X'12'           34
```

```
        DC      X'13'           35
        DC      X'12'           36
        DC      X'13'           37
        DC      X'12'           38
        DC      X'13'           39
        DC      X'12'           40
*
        DC      X'13'           41
        DC      X'12'           42
        DC      X'13'           43
        DC      X'12'           44
        DC      X'13'           45
        DC      X'12'           46
        DC      X'13'           47
        DC      X'12'           48
*
***************************************************************
*
* RESET AND IRQ VECTORS
*
        ASEG
        ORG     0               A RESET CAUSES A RESTART AT LOCATION 0,
        JP      START           JUMP TO THE INITIALIZATION POINT.
*
        ORG     X'38'           AN IRQ (IN MODE 1) CAUSES A RESTART AT
        JP      INT38           LOCATION X'38', JUMP TO THE
*                               INTERRUPT ROUTINE "INT38".
*
***************************************************************
*
* RAM ALLOCATIONS
*
*       THIS RSEG CONTAINS THE RAM ALLOCATIONS FOR THE MAIN PROGRAM.
*       THE ASSEMBLY VARIABLES ARE LISTED BELOW.
*       THE BASIC COMPILER WILL ADD THE BASIC VARIABLES TO THIS RSEG.
*
        RSEG    RAM             ASSEMBLY LANGUAGE VARIABLES
*
AUSTATUS DS     1               AUDIO UART STATUS WORD
CPULS    DS     1               CONTROL PULSE STATE, =0 OR =1
FCOUNT   DS     1               FRAME COUNT (INCREMENTS ONCE/FRAME W/O RESET)
FCOUNT1  DS     1               VALUE OF FCOUNT READ ON PREVIOUS PASS...FNDECODE
FRAME    DS     1               FRAME/FIELD FLAG (NZ = 1 CP/FRAME,  0 = 1 CP/FIELD)
HUMODE   DS     1               HOST UART MODE WORD
HUSTATUS DS     1               HOST UART STATUS WORD
ICNT     DS     1               INTERRUPT COUNTER (INCR'S ONCE PER INTERRUPT)
ICNT1    DS     1               VALUE OF ICNT READ ON PREVIOUS PASS ..... ONESHOT
ICNT2    DS     1               VALUE OF ICNT READ ON CURRENT  PASS ..... ONE SHOT
TICF     DS     1               FRAME TIME COUNTER (INCR'S ON EACH INTERRUPT,
*                                 STOPS AT 255, AND RESETS ON NEW FRAME)
*
        ENDASM
        END
```

Having described our invention, what we claim as new and desire to secure by Letters Patent is:

1. A universal computer, recorded video interface comprising:
   A. an interface computer;
   B. a computer to computer interface for connecting said interface computer to a host computer and for receiving from said host computer video control commands;
   C. a computer to control cable interface for connecting said interface computer to a recorded video source, said cable interface providing a plurality of control lines for connection to said recorded video source; and
   D. means connected to said interface computer for storing a table indicating to or from which of said control lines each of a plurality of recorded video source control signals is to be sent or received by said cable interface.

2. A universal computer, recorded video interface as defined in claim 1 wherein said last named means stores at least two tables for two different types of recorded video sources; and
   E. means connected to said computer for selecting which of said tables is to be used by said computer.

3. A universal computer, recorded video interface as defined in claim 1, and
   F. means responsive to said host computer to apply a signal to a selected one of said control lines, both said signal and said line being chosen by said host computer.

4. A universal computer, recorded video interface as defined in claim 1, wherein said recorded video source provides an audio channel for recording, and
   G. means responsive to control pulses received from said recorded video source and to a command from said host computer to record frame identifying numbers on said audio channel.

5. A universal computer, recorded video interface as defined in claims 1 or 4, and
   H. means responsive to frame identifying numbers recorded on an audio channel at said recorded video source to issue a stop, pause or play command as selected by said host computer.

6. A universal computer, recorded video interface as defined in claim 1, wherein the number of said control lines is greater than the number of said plurality of recorded video source control signals.

7. A universal computer, recorded video interface as defined in claim 6 and an expansion port for connecting said universal computer, recorded video interface to recorded video sources having control schemes differing from those provided by said computer to control cable interface.

8. A universal computer, recorded video interface as defined in claim 7, and
   I. a matrix switching interface connected to said expansion port.

9. A universal computer, recorded video interface as defined in claim 2 wherein said tables correspond to two types of recorded video sources, one type providing a control signal once per frame and the other type providing a control signal twice per frame, and said interface computer being
   responsive to said control signals for determining the operating condition of said recorded video source, selecting which of said tables is to be used, and responsive to each of said control signals or every other control signal depending upon which of said tables is used.

10. A universal computer, recorded video interface as defined in claim 9 wherein said interface computer senses that said recorded video source is in a stopped condition by monitoring said control signals.

11. A universal computer, recorded video interface as defined in claim 1 wherein said table relates a single control line to each control command.

12. A universal computer, recorded video interface as defined in claim 1 wherein said table relates a pair of control lines to each control command.

13. A universal computer, recorded video interface as defined in claims 1, or 2, or 9, or 11 or 12 wherein said table is stored in a read-only memory.

14. A universal computer, recorded video interface as defined in claim 13 wherein a control program for said interface computer is stored in said read-only memory.

15. A universal computer, recorded video interface as defined in claims 1, or 2 or 9, and
   J. means connected to said interface computer for storing a control program for said interface computer and for operating a recorded video source, having a play mode and variable overshoot in rewind and fast forward to search for a target frame from a pre-existing frame, said program providing the steps of:
      a. establishing a stopping range of frame numbers (x to y) before the target frame number, where x is an earlier frame than y;
      b. issuing a fast forward command to the source in response to said pre-existing frame number being less than or equal to x, and, then issuing a stop command to said source in response to the existing frame number being substantially equal to or greater than x;
      c. issuing a rewind command to said source in response to said pre-existing frame number being greater than or equal to y, and, then issuing a stop command to said source in response to the existing frame number being substantially equal to or less than y
   such that the target frame number will come up when the source is placed in the play mode.

16. A universal computer, recorded video interface as defined in claim 15 wherein the maximum number of frames of said overshoot is substantially equal to x.

17. A universal computer, recorded video interface as defined in claim 16 wherein the minimum number of frames of said overshoot is substantially equal to a and it takes b frames for the video to come up in response to a play command when the source is stopped; the method further defined in that y is substantially equal to b minus a.

18. A universal computer, recorded video interface as defined in claim 15 wherein said control program and said tables are stored in a read-only memory.

19. A read-only memory having stored therein:
   A. a control program for a microprocessor of a univeral computer, recorded video interface; and,
   B. at least one table relating which ones of a plurality of control lines are to carry each of a plurality of control command signals to a recorded video source;
   said control program utilizing said table to properly route said command signals to said control lines.

20. A read-only memory as defined in claim 19 wherein said table relates a single control line to each control command.

21. A read-only memory as defined in claim 19 wherein said table relates a pair of control lines to each control command.

22. A read-only memory as defined in claims 19, or 20 or 18 wherein there are stored at least two such tables.

23. A read-only memory as defined in claim 22 incorporated in a single micro electronic package.

24. A read-only memory as defined in claims 19, or 20 or 21 incorporated in a single micro electronic package.

25. The method of operating a recorded video source, having a play mode and variable overshoot in rewind and fast forward, to search for a target frame from a pre-existing frame, comprising the steps of:
  A. establishing a stopping range of frame numbers (x to y) before the target frame number, where x is an earlier frame than y;
  B. issuing a fast forward command to the source in response to said pre-existing frame number being less than or equal to x, and, then issuing a stop command to said source in response to the existing frame number being substantially equal to or greater than x;
  C. issuing a rewind command to said source in response to said pre-existing frame number being greater than or equal to y, and, then issuing a stop command to said source in response to the existing frame number being substantially equal to or less than y such that the target frame number will come up when the source is placed in the play mode.

26. The method of operating a recorded video source as defined in claim 25 wherein the maximum number of frames of said overshoot is substantially equal to x.

27. The method of operating a recorded video source as defined in claims 25 or 26 wherein the minimum number of frames of said overshoot is substantially equal to a and it takes b frames for the video to come up in response to a play command when the source is stopped; the method further defined in that y is substantially equal to b minus a.

28. The method of operating a recorded video source as defined in claim 27 wherein said overshoot is caused by the sum of the inertial overshoot of said source and the response time between target frame number and existing frame number equality and the issuance of said stop command.

29. The method of operating a recorded video source as defined in claim 26 wherein said overshoot is caused by the sum of the inertial overshoot of said source and the response time between target frame number and existing frame number equality and the issuance of said stop command.

* * * * *